US012671471B2

(12) United States Patent
Lee et al.

(10) Patent No.: US 12,671,471 B2
(45) Date of Patent: Jun. 30, 2026

(54) TECHNIQUES FOR CODEBOOK AND CONTROL SIGNALING FOR UPLINK

(71) Applicant: QUALCOMM Incorporated, San Diego, CA (US)

(72) Inventors: Hyojin Lee, San Diego, CA (US); Yu Zhang, San Diego, CA (US); Yi Huang, San Diego, CA (US); Kexin Xiao, Shanghai (CN)

(73) Assignee: QUALCOMM Incorporated, San Diego, CA (US)

( * ) Notice: Subject to any disclaimer, the term of this patent is extended or adjusted under 35 U.S.C. 154(b) by 49 days.

(21) Appl. No.: 18/567,460

(22) PCT Filed: Sep. 3, 2021

(86) PCT No.: PCT/CN2021/116416
§ 371 (c)(1),
(2) Date: Dec. 6, 2023

(87) PCT Pub. No.: WO2023/028981
PCT Pub. Date: Mar. 9, 2023

(65) Prior Publication Data
US 2024/0283503 A1      Aug. 22, 2024

(51) Int. Cl.
*H04B 7/0456* (2017.01)
*H04L 27/26* (2006.01)
(52) U.S. Cl.
CPC ......... *H04B 7/0486* (2013.01); *H04B 7/0481* (2023.05); *H04L 27/2605* (2013.01)
(58) Field of Classification Search
CPC .......................... H04B 7/0486; H04L 27/2605
See application file for complete search history.

(56) References Cited

U.S. PATENT DOCUMENTS

| | | | | |
|---|---|---|---|---|
| 2012/0114072 A1* | 5/2012 | Liu | ..................... | H04B 7/0639 |
| | | | | 375/295 |
| 2014/0362938 A1* | 12/2014 | Krishnamurthy | .... | H04B 7/0456 |
| | | | | 375/267 |
| 2019/0097710 A1 | 3/2019 | Park et al. | | |

(Continued)

FOREIGN PATENT DOCUMENTS

| | | |
|---|---|---|
| CN | 110535499 A | 12/2019 |
| CN | 111818629 A | 10/2020 |
| WO | 2019227312 A1 | 12/2019 |

OTHER PUBLICATIONS

Ericsson: "UL MIMO for Codebook based Transmission", 3GPP TSG-RAN WG1 NR Ad Hoc #3, R1-1716341, Nagoya, Japan, Sep. 18, 2017-Sep. 21, 2017, 16 Pages, Sep. 21, 2017 (Sep. 21, 2017), the whole document.

(Continued)

*Primary Examiner* — Jaison Joseph
(74) *Attorney, Agent, or Firm* — Harrity & Harrity, LLP \ Qualcomm

(57) ABSTRACT

Various aspects of the present disclosure generally relate to wireless communication. In some aspects, a user equipment (UE) may receive signaling identifying a transmission precoding matrix indicator associated with a transmit codebook configured for three antenna ports. The UE may transmit an uplink communication in accordance with the transmit codebook configured for three antenna ports. Numerous other aspects are described.

20 Claims, 43 Drawing Sheets

500 ⟶

(56)     References Cited

U.S. PATENT DOCUMENTS

| | | | | |
|---|---|---|---|---|
| 2020/0220590 A1* | 7/2020 | Sun | ..................... | H04L 25/0391 |
| 2020/0275416 A1* | 8/2020 | Haghighat | .......... | H04L 25/0204 |
| 2021/0314873 A1* | 10/2021 | Huang | .................. | H04W 52/42 |
| 2021/0359733 A1* | 11/2021 | Harrison | ................ | H01Q 21/24 |
| 2022/0376753 A1* | 11/2022 | Faxér | ..................... | H04B 7/065 |
| 2024/0022306 A1* | 1/2024 | Wang | .................. | H04B 7/0456 |
| 2024/0283503 A1* | 8/2024 | Lee | ..................... | H04B 7/0639 |
| 2025/0096997 A1* | 3/2025 | Zhang | ..................... | H04L 5/14 |

OTHER PUBLICATIONS

International Search Report and Written Opinion—PCT/CN2021/116416—ISA/EPO—May 31, 2022.

* cited by examiner

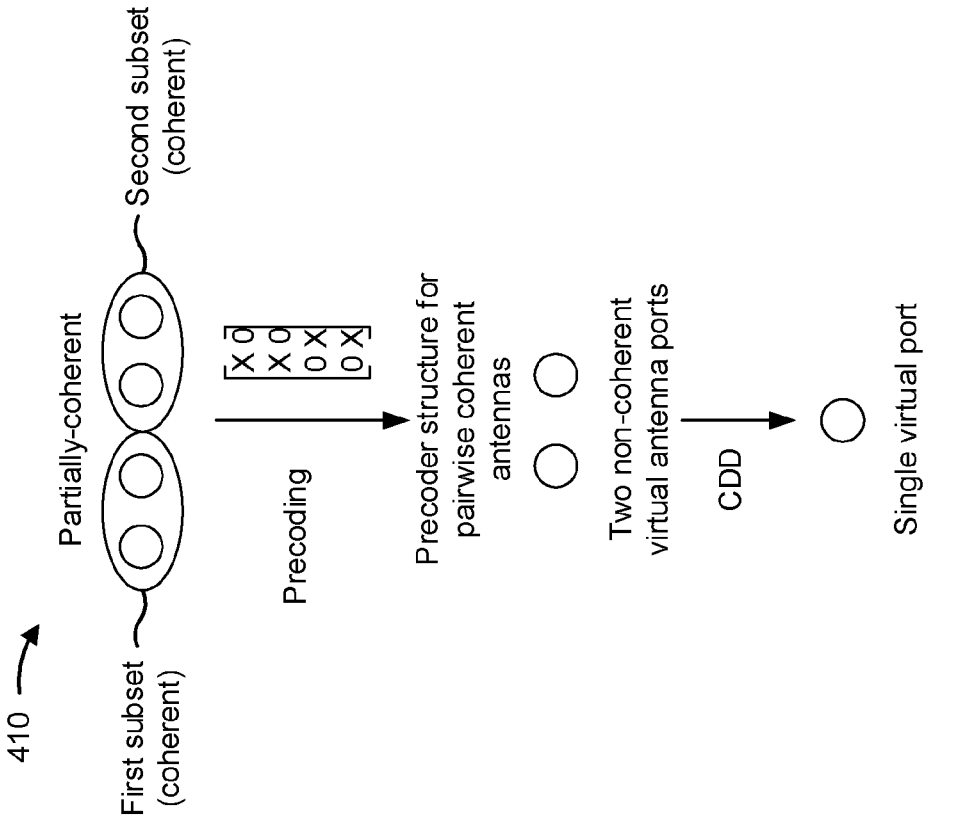
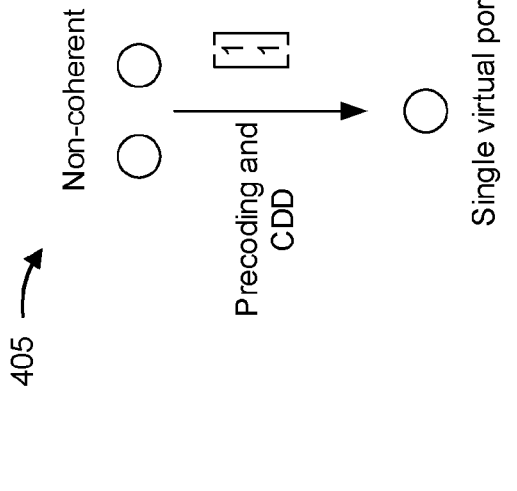
FIG. 4

Receive signaling identifying a transmission precoding matrix indicator associated with a transmit codebook configured for three antenna ports

610

Transmit an uplink communication in accordance with the transmit codebook configured for three antenna ports

620

600

800

*Non-coherent 3 Tx codebook precoders by rank*

Rank 1: 3 precoders $$\frac{1}{\sqrt{3}}\begin{bmatrix}1\\0\\0\end{bmatrix} \quad \frac{1}{\sqrt{3}}\begin{bmatrix}0\\1\\0\end{bmatrix} \quad \frac{1}{\sqrt{3}}\begin{bmatrix}0\\0\\1\end{bmatrix}$$

Rank 2: 3 precoders $$\frac{1}{\sqrt{3}}\begin{bmatrix}1&0\\0&1\\0&0\end{bmatrix} \quad \frac{1}{\sqrt{3}}\begin{bmatrix}1&0\\0&0\\0&1\end{bmatrix} \quad \frac{1}{\sqrt{3}}\begin{bmatrix}0&0\\1&0\\0&1\end{bmatrix}$$

Rank 3: 1 precoder $$\frac{1}{\sqrt{3}}\begin{bmatrix}1&0&0\\0&1&0\\0&0&1\end{bmatrix}$$

FIG. 8

*Partially coherent 3 Tx codebook precoders by rank*

Rank 1: 4 Precoders $$\frac{1}{\sqrt{3}}\begin{bmatrix}1\\1\\0\end{bmatrix} \quad \frac{1}{\sqrt{3}}\begin{bmatrix}1\\j\\0\end{bmatrix} \quad \frac{1}{\sqrt{3}}\begin{bmatrix}1\\-1\\0\end{bmatrix} \quad \frac{1}{\sqrt{3}}\begin{bmatrix}1\\-j\\0\end{bmatrix}$$

Rank 2: 4 Precoders $$\frac{1}{\sqrt{3}}\begin{bmatrix}1 & 0\\1 & 0\\0 & 1\end{bmatrix} \quad \frac{1}{\sqrt{3}}\begin{bmatrix}1 & 0\\j & 0\\0 & 1\end{bmatrix} \quad \frac{1}{\sqrt{3}}\begin{bmatrix}1 & 0\\-1 & 0\\0 & 1\end{bmatrix} \quad \frac{1}{\sqrt{3}}\begin{bmatrix}1 & 0\\-j & 0\\0 & 1\end{bmatrix}$$

Rank 3: 2 Precoders $$\frac{1}{\sqrt{3}}\begin{bmatrix}\frac{1}{\sqrt{2}} & 1 & 0\\\frac{1}{\sqrt{2}} & -1 & 0\\0 & 0 & 1\end{bmatrix} \quad \frac{1}{\sqrt{3}}\begin{bmatrix}\frac{1}{\sqrt{2}} & 1 & 0\\\frac{1}{\sqrt{2}}j & -j & 0\\0 & 0 & 1\end{bmatrix}$$

Rank 1: 4 precoders per PC combination -> 12 precoders

Rank 2: 4 precoders per PC combination -> 12 precoders

Rank 3: 2 precoders per PC combination -> 12 precoders

Coherent: P0 + P1
Non-coherent: P2

Coherent: P1 + P2
Non-coherent: P0

Coherent: P0 + P2
Non-coherent: P1

1100

| # of Precoders | Exponents of Rank-1 Codebook (i.e., $w_l = \frac{1}{\sqrt{3}} e^{j[x,y,z]^T}$) | Minmax Correlation |
|---|---|---|
| 4 | [0, 0, 0], [0, 0, $\pi$], [0, $\pi$, 0], [0, $\pi$, $\pi$] | 0.3333 |
| 6 | [0, 0, 0], [0, 0, $\pi$], [0, $2\pi/3$, 0], [0, $2\pi/3$, $\pi$], [0, $4\pi/3$, 0], [0, $4\pi/3$, $\pi$] | 0.5774 |
| 8 | [0, 0, 0], [0, 0, $\pi$], [0, $\pi/2$, 0], [0, $\pi/2$, $\pi$], [0, $\pi$, 0], [0, $\pi$, $\pi$], [0, $3\pi/2$, 0], [0, $3\pi/2$, $\pi$] | 0.7454 |
| 9 | [0, 0, 0], [0, 0, $2\pi/3$], [0, 0, $4\pi/3$], [0, $2\pi/3$, 0], [0, $2\pi/3$, $2\pi/3$], [0, $2\pi/3$, $4\pi/3$], [0, $4\pi/3$, 0], [0, $4\pi/3$, $2\pi/3$], [0, $4\pi/3$, $4\pi/3$] | 0.5774 |
| 12 | [0, 0, 0], [0, 0, $2\pi/3$], [0, 0, $4\pi/3$], [0, $\pi/2$, 0], [0, $\pi/2$, $2\pi/3$], [0, $\pi/2$, $4\pi/3$], [0, $\pi$, 0], [0, $\pi$, $2\pi/3$], [0, $\pi$, $4\pi/3$], [0, $3\pi/2$, 0], [0, $3\pi/2$, $2\pi/3$], [0, $3\pi/2$, $4\pi/3$] | 0.7454 |
| 16 | [0, 0, 0], [0, 0, $\pi/2$], [0, 0, $\pi$], [0, 0, $3\pi/2$], [0, $\pi/2$, 0], [0, $\pi/2$, $\pi/2$], [0, $\pi/2$, $\pi$], [0, $\pi/2$, $3\pi/2$], [0, $\pi$, 0], [0, $\pi$, $\pi/2$], [0, $\pi$, $\pi$], [0, $\pi$, $3\pi/2$], [0, $3\pi/2$, 0], [0, $3\pi/2$, $\pi/2$], [0, $3\pi/2$, $\pi$], [0, $3\pi/2$, $3\pi/2$] | 0.7454 |

FIG. 11

$$W_l = e^{-j\frac{\pi}{6}}\left(I - \frac{\left(1 - e^{j\frac{2\pi}{3}}\right)}{u_l^H u_l}u_l u_l^H\right)$$

1200

| # of Precoders | Exponents of $u$ vectors ($u_l = [1, \alpha_1, \alpha_2]^T$, $\alpha_1 = w_1 e^{-j\frac{2\pi}{3}}$, $\alpha_2 = w_2 e^{-j\frac{2\pi}{3}}$) |
|---|---|
| 4 | [0, 4π/3, 4π/3], [0, 4π/3, π/3], [0, π/3, 4π/3], [0, π/3, π/3] |
| 6 | [0, 4π/3, 4π/3], [0, 4π/3, π/3], [0, 0, 4π/3], [0, 0, π/3], [0, 2π/3, 4π/3], [0, 2π/3, π/3] |
| 8 | [0, 4π/3, 4π/3], [0, 4π/3, π/3], [0, −π/6, 4π/3], [0, −π/6, π/3], [0, π/3, 4π/3], [0, π/3, π/3], [0, 5π/6, 4π/3], [0, 5π/6, π/3] |
| 9 | [0, 4π/3, 4π/3], [0, 4π/3, 0], [0, 4π/3, 2π/3], [0, 0, 4π/3], [0, 0, 0], [0, 0, 2π/3], [0, 2π/3, 4π/3], [0, 2π/3, 0], [0, 2π/3, 2π/3] |
| 12 | [0, 4π/3, 4π/3], [0, 4π/3, 0], [0, 4π/3, 2π/3], [0, −π/6, 4π/3], [0, −π/6, 0], [0, −π/6, 2π/3], [0, π/3, 4π/3], [0, π/3, 0], [0, π/3, 2π/3], [0, 5π/6, 4π/3], [0, 5π/6, 0], [0, 5π/6, 2π/3] |
| 16 | [0, 4π/3, 4π/3], [0, 4π/3, −π/6], [0, 4π/3, π/3], [0, 4π/3, 5π/6], [0, −π/6, 4π/3], [0, −π/6, −π/6], [0, −π/6, π/3], [0, −π/6, 5π/6], [0, π/3, 4π/3], [0, π/3, −π/6], [0, π/3, π/3], [0, π/3, 5π/6], [0, 5π/6, 4π/3], [0, 5π/6, −π/6], [0, 5π/6, π/3], [0, 5π/6, 5π/6] |

FIG. 12

Rank-3 Householder Codebook for L=9

1300 →

$$w_l = e^{-j\frac{\pi}{6}}\left(I - \frac{\left(1 - e^{j\frac{2\pi}{3}}\right)}{u_l^H u_l}u_l u_l^H\right)$$

| $l$ | $u_l$ | $\sqrt{3}W_l$ |
|---|---|---|
| 0 | $\left[1, e^{j\frac{4\pi}{3}}, e^{j\frac{4\pi}{3}}\right]^T$ | $[1,1,1]^T, \left[e^{j\frac{4\pi}{3}},1,e^{j\frac{2\pi}{3}}\right]^T, \left[e^{j\frac{4\pi}{3}},e^{j\frac{2\pi}{3}},1\right]^T$ |
| 1 | $\left[1, e^{j\frac{4\pi}{3}}, 1\right]^T$ | $\left[1,1,e^{j\frac{2\pi}{3}}\right]^T, \left[e^{j\frac{4\pi}{3}},1,e^{j\frac{4\pi}{3}}\right]^T, \left[e^{j\frac{2\pi}{3}},1,1\right]^T$ |
| 2 | $\left[1, e^{j\frac{4\pi}{3}}, e^{j\frac{2\pi}{3}}\right]^T$ | $\left[1,1,e^{j\frac{4\pi}{3}}\right]^T, \left[e^{j\frac{4\pi}{3}},1,1\right]^T, \left[1,e^{j\frac{4\pi}{3}},1\right]^T$ |
| 3 | $\left[1,1,e^{j\frac{4\pi}{3}}\right]^T$ | $\left[1,e^{j\frac{2\pi}{3}},1\right]^T, \left[e^{j\frac{2\pi}{3}},1,1\right]^T, \left[e^{j\frac{4\pi}{3}},e^{j\frac{4\pi}{3}},1\right]^T$ |
| 4 | $[1,1,1]^T$ | $\left[1,e^{j\frac{2\pi}{3}},e^{j\frac{2\pi}{3}}\right]^T, \left[e^{j\frac{2\pi}{3}},1,e^{j\frac{2\pi}{3}}\right]^T, \left[e^{j\frac{2\pi}{3}},e^{j\frac{2\pi}{3}},1\right]^T$ |
| 5 | $\left[1,1,e^{j\frac{2\pi}{3}}\right]^T$ | $\left[1,e^{j\frac{2\pi}{3}},e^{j\frac{4\pi}{3}}\right]^T, \left[e^{j\frac{2\pi}{3}},1,e^{j\frac{4\pi}{3}}\right]^T, [1,1,1]^T$ |
| 6 | $\left[1,e^{j\frac{2\pi}{3}},e^{j\frac{4\pi}{3}}\right]^T$ | $\left[1,e^{j\frac{4\pi}{3}},1\right]^T, \left[1,1,e^{j\frac{4\pi}{3}}\right]^T, \left[e^{j\frac{4\pi}{3}},1,1\right]^T$ |
| 7 | $\left[1,e^{j\frac{2\pi}{3}},1\right]^T$ | $\left[1,e^{j\frac{4\pi}{3}},e^{j\frac{2\pi}{3}}\right]^T, [1,1,1]^T, \left[e^{j\frac{2\pi}{3}},e^{j\frac{4\pi}{3}},1\right]^T$ |
| 8 | $\left[1,e^{j\frac{2\pi}{3}},e^{j\frac{2\pi}{3}}\right]^T$ | $\left[1,e^{j\frac{4\pi}{3}},e^{j\frac{4\pi}{3}}\right]^T, [1,1,1]^T, \left[1,e^{j\frac{2\pi}{3}},1\right]^T$ |

| $l$ | $\boldsymbol{u}_l$ | $W_l$ |
|---|---|---|
| 0 | $[1, e^{j\frac{4\pi}{3}}, 1]^T$ | $[1, 1, e^{j\frac{2\pi}{3}}]^T, [e^{j\frac{4\pi}{3}}, 1, e^{j\frac{4\pi}{3}}]^T, [e^{j\frac{2\pi}{3}}, 1, 1]^T$ |
| 1 | $[1, e^{j\frac{4\pi}{3}}, e^{j\frac{2\pi}{3}}]^T$ | $[1, 1, e^{j\frac{4\pi}{3}}]^T, [e^{j\frac{4\pi}{3}}, 1, 1]^T, [1, e^{j\frac{4\pi}{3}}, 1]^T$ |
| 2 | $[1, 1, e^{j\frac{4\pi}{3}}]^T$ | $[1, e^{j\frac{2\pi}{3}}, 1]^T, [e^{j\frac{2\pi}{3}}, 1, 1]^T, [e^{j\frac{4\pi}{3}}, e^{j\frac{4\pi}{3}}, 1]^T$ |
| 3 | $[1, 1, 1]^T$ | $[1, e^{j\frac{2\pi}{3}}, e^{j\frac{2\pi}{3}}]^T, [e^{j\frac{2\pi}{3}}, 1, e^{j\frac{2\pi}{3}}]^T, [e^{j\frac{2\pi}{3}}, e^{j\frac{2\pi}{3}}, 1]^T$ |
| 4 | $[1, 1, e^{j\frac{2\pi}{3}}]^T$ | $[1, e^{j\frac{2\pi}{3}}, e^{j\frac{4\pi}{3}}]^T, [e^{j\frac{2\pi}{3}}, 1, e^{j\frac{4\pi}{3}}]^T, [1, 1, 1]^T$ |
| 5 | $[1, e^{j\frac{2\pi}{3}}, e^{j\frac{4\pi}{3}}]^T$ | $[1, e^{j\frac{4\pi}{3}}, 1]^T, [1, 1, e^{j\frac{4\pi}{3}}]^T, [e^{j\frac{4\pi}{3}}, 1, 1]^T$ |
| 6 | $[1, e^{j\frac{2\pi}{3}}, 1]^T$ | $[1, e^{j\frac{4\pi}{3}}, e^{j\frac{2\pi}{3}}]^T, [1, 1, 1]^T, [e^{j\frac{2\pi}{3}}, e^{j\frac{4\pi}{3}}, 1]^T$ |
| 7 | $[1, e^{j\frac{2\pi}{3}}, e^{j\frac{2\pi}{3}}]^T$ | $[1, e^{j\frac{4\pi}{3}}, e^{j\frac{4\pi}{3}}]^T, [1, 1, e^{j\frac{2\pi}{3}}]^T, [1, e^{j\frac{2\pi}{3}}, 1]^T$ |

| $l$ | $u_l$ | $W_l$ |
|---|---|---|
| 0 | $[1, e^{j\frac{4\pi}{3}}, e^{j\frac{4\pi}{3}}]^T$ | $[1,1,1]^T, [e^{j\frac{4\pi}{3}},1,e^{j\frac{2\pi}{3}}]^T, [e^{j\frac{4\pi}{3}},e^{j\frac{2\pi}{3}},1]^T$ |
| 1 | $[1, e^{j\frac{4\pi}{3}}, 1]^T$ | $[1,1,e^{j\frac{2\pi}{3}}]^T, [e^{j\frac{4\pi}{3}},1,e^{j\frac{4\pi}{3}}]^T, [e^{j\frac{2\pi}{3}},1,1]^T$ |
| 2 | $[1, e^{j\frac{4\pi}{3}}, e^{j\frac{2\pi}{3}}]^T$ | $[1,1,e^{j\frac{4\pi}{3}}]^T, [e^{j\frac{2\pi}{3}},1,1]^T, [1,e^{j\frac{4\pi}{3}},1]^T$ |
| 3 | $[1, 1, e^{j\frac{4\pi}{3}}]^T$ | $[1,e^{j\frac{2\pi}{3}},1]^T, [e^{j\frac{2\pi}{3}},1,1]^T, [e^{j\frac{4\pi}{3}},e^{j\frac{4\pi}{3}},1]^T$ |
| 4 | $[1, 1, 1]^T$ | $[1,e^{j\frac{2\pi}{3}},e^{j\frac{2\pi}{3}}]^T, [e^{j\frac{2\pi}{3}},1,e^{j\frac{2\pi}{3}}]^T, [e^{j\frac{2\pi}{3}},e^{j\frac{2\pi}{3}},1]^T$ |
| 5 | $[1, 1, e^{j\frac{2\pi}{3}}]^T$ | $[1,e^{j\frac{2\pi}{3}},e^{j\frac{4\pi}{3}}]^T, [e^{j\frac{2\pi}{3}},1,e^{j\frac{4\pi}{3}}]^T, [1,1,1]^T$ |
| 6 | $[1, e^{j\frac{2\pi}{3}}, e^{j\frac{4\pi}{3}}]^T$ | $[1,e^{j\frac{4\pi}{3}},1]^T, [1,1,e^{j\frac{4\pi}{3}}]^T, [e^{j\frac{2\pi}{3}},1,1]^T$ |
| 7 | $[1, e^{j\frac{2\pi}{3}}, 1]^T$ | $[1,e^{j\frac{4\pi}{3}},e^{j\frac{2\pi}{3}}]^T, [e^{j\frac{2\pi}{3}},e^{j\frac{4\pi}{3}},1]^T, [1,1,1]^T$ |

3 Tx Codebook for Rank 1

| TPMI index | Precoding Matrix | | | | | | | |
|---|---|---|---|---|---|---|---|---|
| 0-7 | $\frac{1}{\sqrt{3}}\begin{bmatrix}1\\0\\0\end{bmatrix}$ | $\frac{1}{\sqrt{3}}\begin{bmatrix}0\\1\\0\end{bmatrix}$ | $\frac{1}{\sqrt{3}}\begin{bmatrix}0\\0\\1\end{bmatrix}$ | $\frac{1}{\sqrt{3}}\begin{bmatrix}1\\1\\0\end{bmatrix}$ | $\frac{1}{\sqrt{3}}\begin{bmatrix}1\\j\\0\end{bmatrix}$ | $\frac{1}{\sqrt{3}}\begin{bmatrix}1\\-1\\0\end{bmatrix}$ | $\frac{1}{\sqrt{3}}\begin{bmatrix}1\\-j\\0\end{bmatrix}$ | $\frac{1}{\sqrt{3}}\begin{bmatrix}1\\1\\1\end{bmatrix}$ |
| 8-15 | $\frac{1}{\sqrt{3}}\begin{bmatrix}1\\1\\e^{j\frac{2\pi}{3}}\end{bmatrix}$ | $\frac{1}{\sqrt{3}}\begin{bmatrix}1\\1\\e^{j\frac{4\pi}{3}}\end{bmatrix}$ | $\frac{1}{\sqrt{3}}\begin{bmatrix}1\\e^{j\frac{2\pi}{3}}\\1\end{bmatrix}$ | $\frac{1}{\sqrt{3}}\begin{bmatrix}1\\e^{j\frac{2\pi}{3}}\\e^{j\frac{2\pi}{3}}\end{bmatrix}$ | $\frac{1}{\sqrt{3}}\begin{bmatrix}1\\e^{j\frac{2\pi}{3}}\\e^{j\frac{4\pi}{3}}\end{bmatrix}$ | $\frac{1}{\sqrt{3}}\begin{bmatrix}1\\e^{j\frac{4\pi}{3}}\\1\end{bmatrix}$ | $\frac{1}{\sqrt{3}}\begin{bmatrix}1\\e^{j\frac{4\pi}{3}}\\e^{j\frac{2\pi}{3}}\end{bmatrix}$ | $\frac{1}{\sqrt{3}}\begin{bmatrix}1\\e^{j\frac{4\pi}{3}}\\e^{j\frac{4\pi}{3}}\end{bmatrix}$ |

Figure 16B:
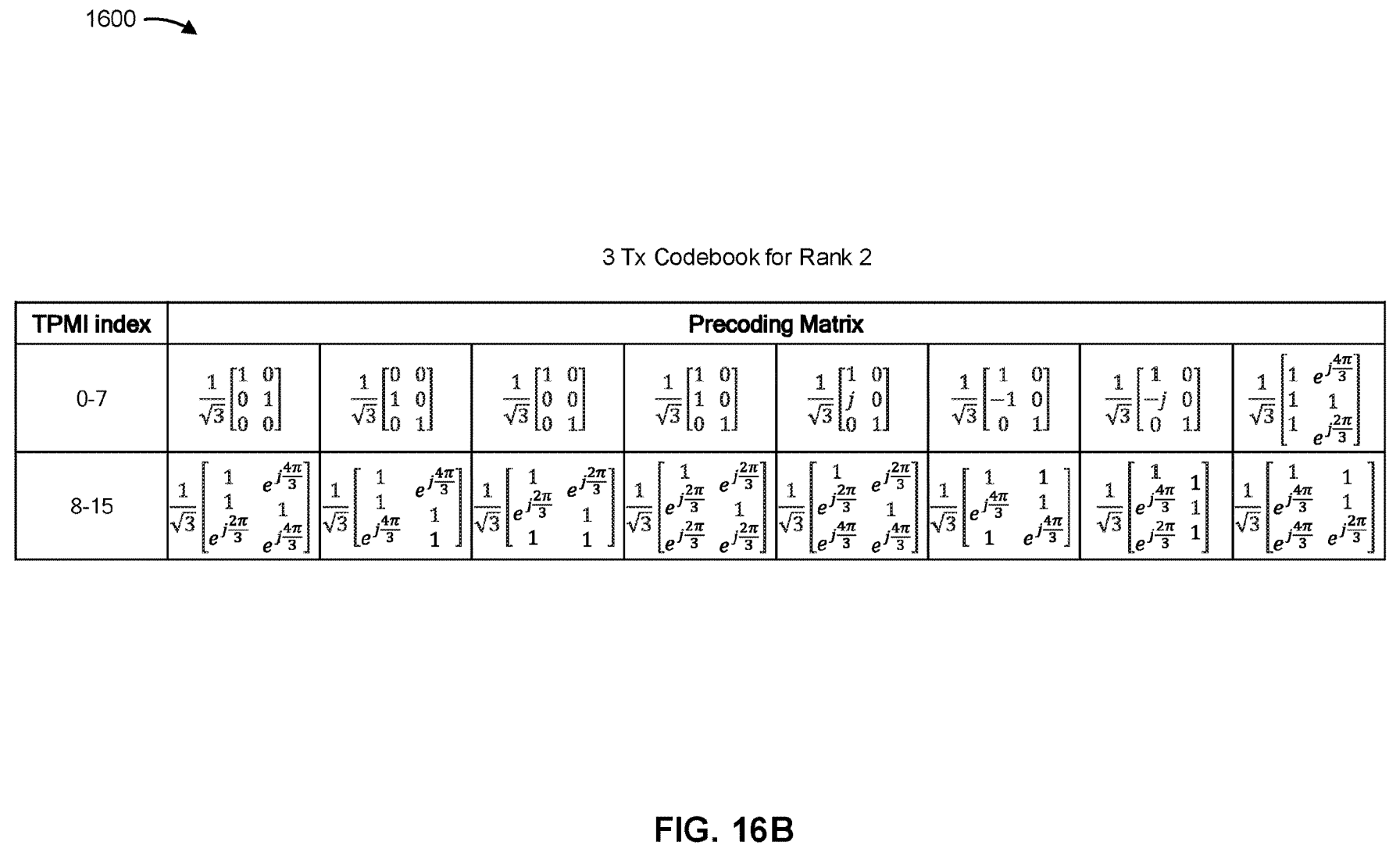

3 Tx Codebook for Rank 2

| TPMI index | Precoding Matrix | | | | | | | |
|---|---|---|---|---|---|---|---|---|
| 0-7 | $\frac{1}{\sqrt{3}}\begin{bmatrix}1&0\\0&1\\0&0\end{bmatrix}$ | $\frac{1}{\sqrt{3}}\begin{bmatrix}0&0\\1&0\\0&1\end{bmatrix}$ | $\frac{1}{\sqrt{3}}\begin{bmatrix}1&0\\0&0\\0&1\end{bmatrix}$ | $\frac{1}{\sqrt{3}}\begin{bmatrix}1&0\\1&0\\0&1\end{bmatrix}$ | $\frac{1}{\sqrt{3}}\begin{bmatrix}1&0\\-1&0\\0&1\end{bmatrix}$ | $\frac{1}{\sqrt{3}}\begin{bmatrix}1&0\\j&0\\0&1\end{bmatrix}$ | $\frac{1}{\sqrt{3}}\begin{bmatrix}1&0\\-j&0\\0&1\end{bmatrix}$ | $\frac{1}{\sqrt{3}}\begin{bmatrix}1&0\\1&1\\1&e^{j\frac{4\pi}{3}}\end{bmatrix}$ |
| 8-15 | $\frac{1}{\sqrt{3}}\begin{bmatrix}1&e^{j\frac{4\pi}{3}}\\1&1\\e^{j\frac{2\pi}{3}}&e^{j\frac{4\pi}{3}}\end{bmatrix}$ | $\frac{1}{\sqrt{3}}\begin{bmatrix}1&e^{j\frac{4\pi}{3}}\\1&1\\e^{j\frac{4\pi}{3}}&e^{j\frac{2\pi}{3}}\end{bmatrix}$ | $\frac{1}{\sqrt{3}}\begin{bmatrix}1&1\\e^{j\frac{2\pi}{3}}&e^{j\frac{2\pi}{3}}\\e^{j\frac{4\pi}{3}}&e^{j\frac{2\pi}{3}}\end{bmatrix}$ | $\frac{1}{\sqrt{3}}\begin{bmatrix}1&e^{j\frac{2\pi}{3}}\\e^{j\frac{2\pi}{3}}&1\\e^{j\frac{4\pi}{3}}&e^{j\frac{2\pi}{3}}\end{bmatrix}$ | $\frac{1}{\sqrt{3}}\begin{bmatrix}1&1\\e^{j\frac{4\pi}{3}}&1\\1&e^{j\frac{4\pi}{3}}\end{bmatrix}$ | $\frac{1}{\sqrt{3}}\begin{bmatrix}1&1\\e^{j\frac{4\pi}{3}}&1\\e^{j\frac{2\pi}{3}}&1\end{bmatrix}$ | $\frac{1}{\sqrt{3}}\begin{bmatrix}1&1\\e^{j\frac{4\pi}{3}}&e^{j\frac{4\pi}{3}}\\e^{j\frac{2\pi}{3}}&e^{j\frac{2\pi}{3}}\end{bmatrix}$ | $\frac{1}{\sqrt{3}}\begin{bmatrix}1&1\\e^{j\frac{4\pi}{3}}&e^{j\frac{4\pi}{3}}\\e^{j\frac{2\pi}{3}}&e^{j\frac{2\pi}{3}}\end{bmatrix}$ |

3 Tx Codebook for Rank 3

| TPMI index | Precoding Matrix | | |
|---|---|---|---|
| 0-3 | $\frac{1}{\sqrt{3}}\begin{bmatrix}1&0&0\\0&1&0\\0&0&1\end{bmatrix}$ | $\frac{1}{\sqrt{3}}\frac{1}{\sqrt{2}}\begin{bmatrix}1&1&0\\1&-1&0\\0&0&1\end{bmatrix}$ | $\frac{1}{\sqrt{3}}\frac{1}{\sqrt{2}}\begin{bmatrix}1&1&0\\j&-j&0\\0&0&1\end{bmatrix}$ | $\frac{1}{\sqrt{3}}\begin{bmatrix}1&e^{j\frac{4\pi}{3}}&e^{j\frac{2\pi}{3}}\\1&1&1\\1&e^{j\frac{2\pi}{3}}&e^{j\frac{4\pi}{3}}\end{bmatrix}$ |
| 4-7 | $\frac{1}{\sqrt{3}}\begin{bmatrix}1&e^{j\frac{4\pi}{3}}&e^{j\frac{2\pi}{3}}\\1&1&1\\e^{j\frac{2\pi}{3}}&e^{j\frac{4\pi}{3}}&1\end{bmatrix}$ | $\frac{1}{\sqrt{3}}\begin{bmatrix}1&e^{j\frac{4\pi}{3}}&1\\1&1&e^{j\frac{4\pi}{3}}\\e^{j\frac{4\pi}{3}}&1&1\end{bmatrix}$ | $\frac{1}{\sqrt{3}}\begin{bmatrix}1&e^{j\frac{2\pi}{3}}&e^{j\frac{4\pi}{3}}\\e^{j\frac{2\pi}{3}}&1&1\\1&1&1\end{bmatrix}$ | $\frac{1}{\sqrt{3}}\begin{bmatrix}1&e^{j\frac{2\pi}{3}}&e^{j\frac{2\pi}{3}}\\e^{j\frac{2\pi}{3}}&1&e^{j\frac{2\pi}{3}}\\1&1&1\end{bmatrix}$ |
| 8-11 | $\frac{1}{\sqrt{3}}\begin{bmatrix}1&e^{j\frac{2\pi}{3}}&1\\e^{j\frac{2\pi}{3}}&1&1\\e^{j\frac{4\pi}{3}}&e^{j\frac{4\pi}{3}}&1\end{bmatrix}$ | $\frac{1}{\sqrt{3}}\begin{bmatrix}1&e^{j\frac{4\pi}{3}}&1\\e^{j\frac{4\pi}{3}}&1&1\\e^{j\frac{2\pi}{3}}&e^{j\frac{4\pi}{3}}&1\end{bmatrix}$ | $\frac{1}{\sqrt{3}}\begin{bmatrix}1&1&1\\e^{j\frac{4\pi}{3}}&1&e^{j\frac{2\pi}{3}}\\e^{j\frac{4\pi}{3}}&e^{j\frac{2\pi}{3}}&1\end{bmatrix}$ | $\frac{1}{\sqrt{3}}\begin{bmatrix}1&1&1\\1&1&1\\1&e^{j\frac{2\pi}{3}}&1\end{bmatrix}$ |

First CSR or Second CSR (3 or 4 bit TPMI field)

| TPMI Bit field mapped to index | codebookSubset = PC | codebookSubset = NC |
|---|---|---|
| 0 | 1 layer: TPMI=3 | 1 layer: TPMI=0 |
| 1 | 1 layer: TPMI=4 | 1 layer: TPMI=1 |
| 2 | 1 layer: TPMI=5 | 1 layer: TPMI=2 |
| 3 | 1 layers: TPMI=6 | 2 layers: TPMI=0 |
| 4 | 2 layers: TPMI=3 | 2 layers: TPMI=1 |
| 5 | 2 layer: TPMI=4 | 2 layers: TPMI=2 |
| 6 | 2 layer: TPMI=5 | 3 layers: TPMI=0 |
| 7 | 2 layer: TPMI=6 | |
| 8 | 3 layers: TPMI=1 | |
| 9 | 3 layers: TPMI=2 | |

Third CSR (2-bit RI field, 3-bit TPMI field)

| TPMI Bit field mapped to index | When RI = 0 | When RI = 1 | When RI = 2 |
|---|---|---|---|
| 0 | 1 layer: TPMI = 7 | 2 layers: TPMI = 7 | 3 layers: TPMI = 3 |
| 1 | 1 layer: TPMI = 8 | 2 layers: TPMI = 8 | 3 layers: TPMI = 4 |
| ... | ... | ... | ... |
| 7 | 1 layer: TPMI = 14 | 2 layers: TPMI = 14 | 3 layers: TPMI = 10 |

| RI | # of layers |
|---|---|
| 0 | 1 |
| 1 | 2 |
| 2 | 3 |
| 3 | - |

| TPMI Bit field mapped to index | codebookSubset = FC+PC+NC | TPMI Bit field mapped to index | codebookSubset = PC+NC | TPMI Bit field mapped to index | codebookSubset = NC |
|---|---|---|---|---|---|
| 0 | 1 layer: TPMI=0 | 0 | 1 layer: TPMI=0 | 0 | 1 layer: TPMI=0 |
| 1 | 1 layer: TPMI=1 | 1 | 1 layer: TPMI=1 | 1 | 1 layer: TPMI=1 |
| 2 | 1 layer: TPMI=2 | 2 | 1 layer: TPMI=2 | 2 | 1 layer: TPMI=2 |
| 3 | 2 layers: TPMI=0 | 3 | 2 layers: TPMI=0 | 3 | 2 layers: TPMI=0 |
| 4 | 2 layers: TPMI=1 | 4 | 2 layers: TPMI=1 | 4 | 2 layers: TPMI=1 |
| 5 | 2 layers: TPMI=2 | 5 | 2 layers: TPMI=2 | 5 | 2 layers: TPMI=2 |
| 6 | 3 layers: TPMI=0 | 6 | 3 layers: TPMI=0 | 6 | 3 layers: TPMI=0 |
| 7 | 1 layer: TPMI=3 | 7 | 1 layer: TPMI=3 | | |
| 8 | 1 layer: TPMI=4 | 8 | 1 layer: TPMI=4 | | |
| 9 | 1 layer: TPMI=5 | 9 | 1 layer: TPMI=5 | | |
| 10 | 1 layers: TPMI=6 | 10 | 1 layers: TPMI=6 | | |
| 11 | 2 layers: TPMI=3 | 11 | 2 layers: TPMI=3 | | |
| 12 | 2 layer: TPMI=4 | 12 | 2 layer: TPMI=4 | | |
| 13 | 2 layer: TPMI=5 | 13 | 2 layer: TPMI=5 | | |
| 14 | 2 layer: TPMI=6 | 14 | 2 layer: TPMI=6 | | |
| 15 | 3 layers: TPMI=1 (or 2) | 15 | 3 layers: TPMI=1 (or TPMI=2) | | |
| 16 – 23 | 1 layers: TPMI=7-14 | | | | |
| 24 – 31 | 2 layers: TPMI=7-14 | | | | |
| 32 - 39 | 3 layers: TPMI=3-10 | | | | |

Third CSR        Second CSR        First CSR

| Third CSR | | Second CSR | | First CSR | |
|---|---|---|---|---|---|
| TPMI Bit field mapped to index | codebookSubset = FC+PC+NC | TPMI Bit field mapped to index | codebookSubset = PC+NC | TPMI Bit field mapped to index | codebookSubset = NC |
| 0 | 1 layer: TPMI=0 | 0 | 1 layer: TPMI=0 | 0 | 1 layer: TPMI=0 |
| 1 | 1 layer: TPMI=1 | 1 | 1 layer: TPMI=1 | 1 | 1 layer: TPMI=1 |
| 2 | 1 layer: TPMI=2 | 2 | 1 layer: TPMI=2 | 2 | 1 layer: TPMI=2 |
| 3 | 2 layers: TPMI=0 | 3 | 2 layers: TPMI=0 | 3 | 2 layers: TPMI=0 |
| 4 | 2 layers: TPMI=1 | 4 | 2 layers: TPMI=1 | 4 | 2 layers: TPMI=1 |
| 5 | 2 layers: TPMI=2 | 5 | 2 layers: TPMI=2 | 5 | 2 layers: TPMI=2 |
| 6 | 3 layers: TPMI=0 | 6 | 3 layers: TPMI=0 | 6 | 3 layers: TPMI=0 |
| 7 | 1 layer: TPMI=3 | 7 | 1 layer: TPMI=3 | | |
| 8 | 1 layer: TPMI=4 | 8 | 1 layer: TPMI=4 | | |
| 9 | 1 layer: TPMI=5 | 9 | 1 layer: TPMI=5 | | |
| 10 | 1 layers: TPMI=6 | 10 | 1 layers: TPMI=6 | | |
| 11 | 2 layers: TPMI=3 | 11 | 2 layers: TPMI=3 | | |
| 12 | 2 layer: TPMI=4 | 12 | 2 layer: TPMI=4 | | |
| 13 | 2 layer: TPMI=5 | 13 | 2 layer: TPMI=5 | | |
| 14 | 2 layer: TPMI=6 | 14 | 2 layer: TPMI=6 | | |
| 15 – 22 | 1 layers: TPMI=7-14 | 15 | 3 layers: Reserved | | |
| 23 – 30 | 2 layers: TPMI=7-14 | | | | |
| 31 – 38 | 3 layers: TPMI=3-10 | | | | |

Third CSR

| TPMI Bit field mapped to index | codebookSubset = FC+PC+NC |
|---|---|
| 0 | 1 layer: TPMI=0 |
| 1 | 1 layer: TPMI=1 |
| 2 | 1 layer: TPMI=2 |
| 3 | 2 layers: TPMI=0 |
| 4 | 2 layers: TPMI=1 |
| 5 | 2 layers: TPMI=2 |
| 6 | 3 layers: TPMI=0 |
| 7 | 1 layer: TPMI=3 |
| 8 | 1 layer: TPMI=4 |
| 9 | 1 layer: TPMI=5 |
| 10 | 1 layers: TPMI=6 |
| 11 | 2 layers: TPMI=3 |
| 12 | 2 layer: TPMI=4 |
| 13 | 2 layer: TPMI=5 |
| 14 | 2 layer: TPMI=6 |
| 15 | 3 layers: TPMI=1 (or 2) |
| 16 – 23 | 1 layers: TPMI=7-14 |
| 24 – 31 | Indicate 8 precoders down-selected from 2 layers: TPMI=7-15 and 3 layers: TPMI=3-11 |

Second CSR

| TPMI Bit field mapped to index | codebookSubset = PC+NC |
|---|---|
| 0 | 1 layer: TPMI=0 |
| 1 | 1 layer: TPMI=1 |
| 2 | 1 layer: TPMI=2 |
| 3 | 2 layers: TPMI=0 |
| 4 | 2 layers: TPMI=1 |
| 5 | 2 layers: TPMI=2 |
| 6 | 3 layers: TPMI=0 |
| 7 | 1 layer: TPMI=3 |
| 8 | 1 layer: TPMI=4 |
| 9 | 1 layer: TPMI=5 |
| 10 | 1 layers: TPMI=6 |
| 11 | 2 layers: TPMI=3 |
| 12 | 2 layer: TPMI=4 |
| 13 | 2 layer: TPMI=5 |
| 14 | 2 layer: TPMI=6 |
| 15 | 3 layers: TPMI=1 (or TPMI=2) |

First CSR

| TPMI Bit field mapped to index | codebookSubset = NC |
|---|---|
| 0 | 1 layer: TPMI=0 |
| 1 | 1 layer: TPMI=1 |
| 2 | 1 layer: TPMI=2 |
| 3 | 2 layers: TPMI=0 |
| 4 | 2 layers: TPMI=1 |
| 5 | 2 layers: TPMI=2 |
| 6 | 3 layers: TPMI=0 |

| Third CSR | | Second CSR | | First CSR | |
|---|---|---|---|---|---|
| TPMI Bit field mapped to index | codebookSubset = FC+PC+NC | TPMI Bit field mapped to index | codebookSubset = PC+NC | TPMI Bit field mapped to index | codebookSubset = NC |
| 0 | 1 layer: TPMI=0 | 0 | 1 layer: TPMI=0 | 0 | 1 layer: TPMI=0 |
| 1 | 1 layer: TPMI=1 | 1 | 1 layer: TPMI=1 | 1 | 1 layer: TPMI=1 |
| 2 | 1 layer: TPMI=2 | 2 | 1 layer: TPMI=2 | 2 | 1 layer: TPMI=2 |
| 3 | 2 layers: TPMI=0 | 3 | 2 layers: TPMI=0 | 3 | 2 layers: TPMI=0 |
| 4 | 2 layers: TPMI=1 | 4 | 2 layers: TPMI=1 | 4 | 2 layers: TPMI=1 |
| 5 | 2 layers: TPMI=2 | 5 | 2 layers: TPMI=2 | 5 | 2 layers: TPMI=2 |
| 6 | 3 layers: TPMI=0 | 6 | 3 layers: TPMI=0 | 6 | 3 layers: TPMI=0 |
| 7 | 1 layer: TPMI=3 | 7 | 1 layer: TPMI=3 | | |
| 8 | 1 layer: TPMI=4 | 8 | 1 layer: TPMI=4 | | |
| 9 | 1 layer: TPMI=5 | 9 | 1 layer: TPMI=5 | | |
| 10 | 1 layers: TPMI=6 | 10 | 1 layers: TPMI=6 | | |
| 11 | 2 layers: TPMI=3 | 11 | 2 layers: TPMI=3 | | |
| 12 | 2 layer: TPMI=4 | 12 | 2 layer: TPMI=4 | | |
| 13 | 2 layer: TPMI=5 | 13 | 2 layer: TPMI=5 | | |
| 14 | 2 layer: TPMI=6 | 14 | 2 layer: TPMI=6 | | |
| 15 – 22 | 1 layers: TPMI=7-14 | 15 | Reserved | | |
| 23 – 30 | Indicate 8 precoders down-selected from 2 layers: TPMI=7-15 and 3 layers: TPMI=3-11 | | | | |

| Third CSR | | Second CSR | | First CSR | |
|---|---|---|---|---|---|
| TPMI Bit field mapped to index | codebookSubset = FC+PC+NC | TPMI Bit field mapped to index | codebookSubset = PC+NC | TPMI Bit field mapped to index | codebookSubset = NC |
| 0 | 1 layer: TPMI=0 | 0 | 1 layer: TPMI=0 | 0 | 1 layer: TPMI=0 |
| 1 | 1 layer: TPMI=1 | 1 | 1 layer: TPMI=1 | 1 | 1 layer: TPMI=1 |
| 2 | 1 layer: TPMI=2 | 2 | 1 layer: TPMI=2 | 2 | 1 layer: TPMI=2 |
| 3 | 2 layers: TPMI=0 | 3 | 2 layers: TPMI=0 | 3 | 2 layers: TPMI=0 |
| 4 | 2 layers: TPMI=1 | 4 | 2 layers: TPMI=1 | 4 | 2 layers: TPMI=1 |
| 5 | 2 layers: TPMI=2 | 5 | 2 layers: TPMI=2 | 5 | 2 layers: TPMI=2 |
| 6 | 3 layers: TPMI=0 | 6 | 3 layers: TPMI=0 | 6 | 3 layers: TPMI=0 |
| 7 | 1 layer: TPMI=3 | 7 | 1 layer: TPMI=3 | | |
| 8 | 1 layer: TPMI=4 | 8 | 1 layer: TPMI=4 | | |
| 9 | 1 layer: TPMI=5 | 9 | 1 layer: TPMI=5 | | |
| 10 | 1 layers: TPMI=6 | 10 | 1 layers: TPMI=6 | | |
| 11 | 2 layers: TPMI=3 | 11 | 2 layers: TPMI=3 | | |
| 12 | 2 layer: TPMI=4 | 12 | 2 layer: TPMI=4 | | |
| 13 | 2 layer: TPMI=5 | 13 | 2 layer: TPMI=5 | | |
| 14 | 2 layer: TPMI=6 | 14 | 2 layer: TPMI=6 | | |
| 15 – 22 | 1 layers: TPMI=7-14 | 15 | Reserved | | |
| 23 – 31 | Indicate 9 precoders down-selected from 2 layers: TPMI=7-15 and 3 layers: TPMI=3-11 | | | | |

| Third CSR | | Second CSR | | First CSR | |
|---|---|---|---|---|---|
| TPMI Bit field mapped to index | codebookSubset = FC+PC+NC | TPMI Bit field mapped to index | codebookSubset = PC+NC | TPMI Bit field mapped to index | codebookSubset = NC |
| 0 | 1 layer: TPMI=0 | 0 | 1 layer: TPMI=0 | 0 | 1 layer: TPMI=0 |
| 1 | 1 layer: TPMI=1 | 1 | 1 layer: TPMI=1 | 1 | 1 layer: TPMI=1 |
| 2 | 1 layer: TPMI=2 | 2 | 1 layer: TPMI=2 | 2 | 1 layer: TPMI=2 |
| 3 | 2 layers: TPMI=0 | 3 | 2 layers: TPMI=0 | 3 | 2 layers: TPMI=0 |
| 4 | 2 layers: TPMI=1 | 4 | 2 layers: TPMI=1 | 4 | 2 layers: TPMI=1 |
| 5 | 2 layers: TPMI=2 | 5 | 2 layers: TPMI=2 | 5 | 2 layers: TPMI=2 |
| 6 | 3 layers: TPMI=0 | 6 | 3 layers: TPMI=0 | 6 | 3 layers: TPMI=0 |
| 7 | 1 layer: TPMI=3 | 7 | 1 layer: TPMI=3 | | |
| 8 | 1 layer: TPMI=4 | 8 | 1 layer: TPMI=4 | | |
| 9 | 1 layer: TPMI=5 | 9 | 1 layer: TPMI=5 | | |
| 10 | 1 layers: TPMI=6 | 10 | 1 layers: TPMI=6 | | |
| 11 | 2 layers: TPMI=3 | 11 | 2 layers: TPMI=3 | | |
| 12 | 2 layer: TPMI=4 | 12 | 2 layer: TPMI=4 | | |
| 13 | 2 layer: TPMI=5 | 13 | 2 layer: TPMI=5 | | |
| 14 | 2 layer: TPMI=6 | 14 | 2 layer: TPMI=6 | | |
| 15 – 23 | 1 layers: TPMI=7-15 Indicate 8 precoders down-selected from | 15 | Reserved | | |
| 24 – 31 | 2 layers: TPMI=7-15 and 3 layers: TPMI=3-11 | | | | |

Table 1

| RI | # of layers |
|----|-------------|
| 0 | 1 |
| 1 | 2 |
| 2 | 3 |
| 3 | - |

Table 2

| First CSR | codebookSubset = NC | | |
|-----------|---------------------|---|---|
| TPMI Bit field mapped to index | When RI = 0 | When RI = 1 | When RI = 2 |
| 0 | 1 layer: TPMI = 0 | 2 layers: TPMI = 0 | 3 layers: TPMI = 0 |
| 1 | 1 layer: TPMI = 1 | 2 layers: TPMI = 1 | Reserved |
| 2 | 1 layer: TPMI = 2 | 2 layers: TPMI = 2 | Reserved |
| 3 | Reserved | Reserved | Reserved |

Second CSR          codebookSubset = PC+NC

| TPMI Bit field mapped to index | When RI = 0 | When RI = 1 | When RI = 2 |
|---|---|---|---|
| 0 | 1 layer: TPMI = 0 | 2 layers: TPMI = 0 | 3 layers: TPMI = 0 |
| 1 | 1 layer: TPMI = 1 | 2 layers: TPMI = 1 | 3 layers: TPMI = 1 |
| 2 | 1 layer: TPMI = 2 | 2 layers: TPMI = 2 | 3 layers: TPMI = 2 |
| 3 | 1 layer: TPMI = 3 | 2 layers: TPMI = 3 | Reserved |
| 4 | 1 layer: TPMI = 4 | 2 layers: TPMI = 4 | Reserved |
| 5 | 1 layer: TPMI = 5 | 2 layers: TPMI = 5 | Reserved |
| 6 | 1 layer: TPMI = 6 | 2 layers: TPMI = 6 | Reserved |
| 7 | Reserved | Reserved | Reserved |

Third CSR          codebookSubset = FC+PC+NC

| TPMI Bit field mapped to index | When RI = 0 | When RI = 1 | When RI = 2 |
|---|---|---|---|
| 0 | 1 layer: TPMI = 0 | 2 layers: TPMI = 0 | 3 layers: TPMI = 0 |
| 1 | 1 layer: TPMI = 1 | 2 layers: TPMI = 1 | 3 layers: TPMI = 1 |
| ... | ... | ... | ... |
| 11 | 1 layer: TPMI = 11 | 2 layers: TPMI = 11 | 3 layers: TPMI = 11 |
| 12 | 1 layer: TPMI = 12 | 2 layers: TPMI = 12 | Reserved |
| 13 | 1 layer: TPMI = 13 | 2 layers: TPMI = 13 | Reserved |
| 14 | 1 layer: TPMI = 14 | 2 layers: TPMI = 14 | Reserved |
| 15 | 1 layer: TPMI = 15 | 2 layers: TPMI = 15 | Reserved |

Rank 1:

| TPMI index | Precoding Matrix | | | | | |
|---|---|---|---|---|---|---|
| 0-7 | $\frac{1}{\sqrt{3}}\begin{bmatrix}1\\0\\0\end{bmatrix}$ | $\frac{1}{\sqrt{3}}\begin{bmatrix}0\\1\\0\end{bmatrix}$ | $\frac{1}{\sqrt{3}}\begin{bmatrix}1\\1\\0\end{bmatrix}$ | $\frac{1}{\sqrt{3}}\begin{bmatrix}1\\j\\0\end{bmatrix}$ | $\frac{1}{\sqrt{3}}\begin{bmatrix}1\\-1\\0\end{bmatrix}$ | $\frac{1}{\sqrt{3}}\begin{bmatrix}1\\-j\\0\end{bmatrix}$ |
| 8-15 | Fully coherent rank-1 precoders | | | | | |

Rank 2:

| TPMI index | Precoding Matrix | | | | | |
|---|---|---|---|---|---|---|
| 0-6 | $\frac{1}{\sqrt{3}}\begin{bmatrix}1&0\\0&1\\0&0\end{bmatrix}$ | $\frac{1}{\sqrt{3}}\begin{bmatrix}1&0\\0&0\\0&1\end{bmatrix}$ | $\frac{1}{\sqrt{3}}\begin{bmatrix}1&0\\1&0\\0&1\end{bmatrix}$ | $\frac{1}{\sqrt{3}}\begin{bmatrix}1&0\\j&0\\0&1\end{bmatrix}$ | $\frac{1}{\sqrt{3}}\begin{bmatrix}1&0\\-1&0\\0&1\end{bmatrix}$ | $\frac{1}{\sqrt{3}}\begin{bmatrix}1&0\\-j&0\\0&1\end{bmatrix}$ |

Rank 3:

| TPMI index | Precoding Matrix |
|---|---|
| 0 | $\frac{1}{\sqrt{3}}\begin{bmatrix}1&0&0\\0&1&0\\0&0&1\end{bmatrix}$ |

Rank 1:

| TPMI index | Precoding Matrix | | | | | | | |
|---|---|---|---|---|---|---|---|---|
| 0-7 | $\frac{1}{\sqrt{3}}\begin{bmatrix}1\\0\\0\end{bmatrix}$ | $\frac{1}{\sqrt{3}}\begin{bmatrix}0\\1\\0\end{bmatrix}$ | $\frac{1}{\sqrt{3}}\begin{bmatrix}0\\0\\1\end{bmatrix}$ | $\frac{1}{\sqrt{3}}\begin{bmatrix}1\\1\\0\end{bmatrix}$ | $\frac{1}{\sqrt{3}}\begin{bmatrix}1\\j\\0\end{bmatrix}$ | $\frac{1}{\sqrt{3}}\begin{bmatrix}1\\-1\\0\end{bmatrix}$ | $\frac{1}{\sqrt{3}}\begin{bmatrix}1\\-j\\0\end{bmatrix}$ |
| 8-15 | | | | | | | |

Fully coherent rank-1 precoders

Rank 2:

| TPMI index | Precoding Matrix | | | | |
|---|---|---|---|---|---|
| 0-7 | $\frac{1}{\sqrt{3}}\begin{bmatrix}1&0\\0&1\\0&0\end{bmatrix}$ | $\frac{1}{\sqrt{3}}\begin{bmatrix}0&0\\1&0\\0&1\end{bmatrix}$ | $\frac{1}{\sqrt{3}}\begin{bmatrix}1&0\\0&0\\0&1\end{bmatrix}$ | $\frac{1}{\sqrt{3}}\begin{bmatrix}1&0\\j&0\\0&1\end{bmatrix}$ | $\frac{1}{\sqrt{3}}\begin{bmatrix}1&0\\-1&0\\0&1\end{bmatrix}$ | $\frac{1}{\sqrt{3}}\begin{bmatrix}1&0\\-j&0\\0&1\end{bmatrix}$ |
| 8-14 | $\frac{1}{\sqrt{3}}\begin{bmatrix}0&1\\1&0\\j&0\end{bmatrix}$ | $\frac{1}{\sqrt{3}}\begin{bmatrix}0&1\\1&0\\-j&0\end{bmatrix}$ | $\frac{1}{\sqrt{3}}\begin{bmatrix}1&0\\0&1\\j&0\end{bmatrix}$ | $\frac{1}{\sqrt{3}}\begin{bmatrix}1&0\\0&1\\-j&0\end{bmatrix}$ | $\frac{1}{\sqrt{3}}\begin{bmatrix}0&1\\1&0\\1&0\end{bmatrix}$ |

Rank 3:

| TPMI index | Precoding Matrix | |
|---|---|---|
| 0 | $\frac{1}{\sqrt{3}}\begin{bmatrix}1&0&0\\0&1&0\\0&0&1\end{bmatrix}$ | |

Figure 20:
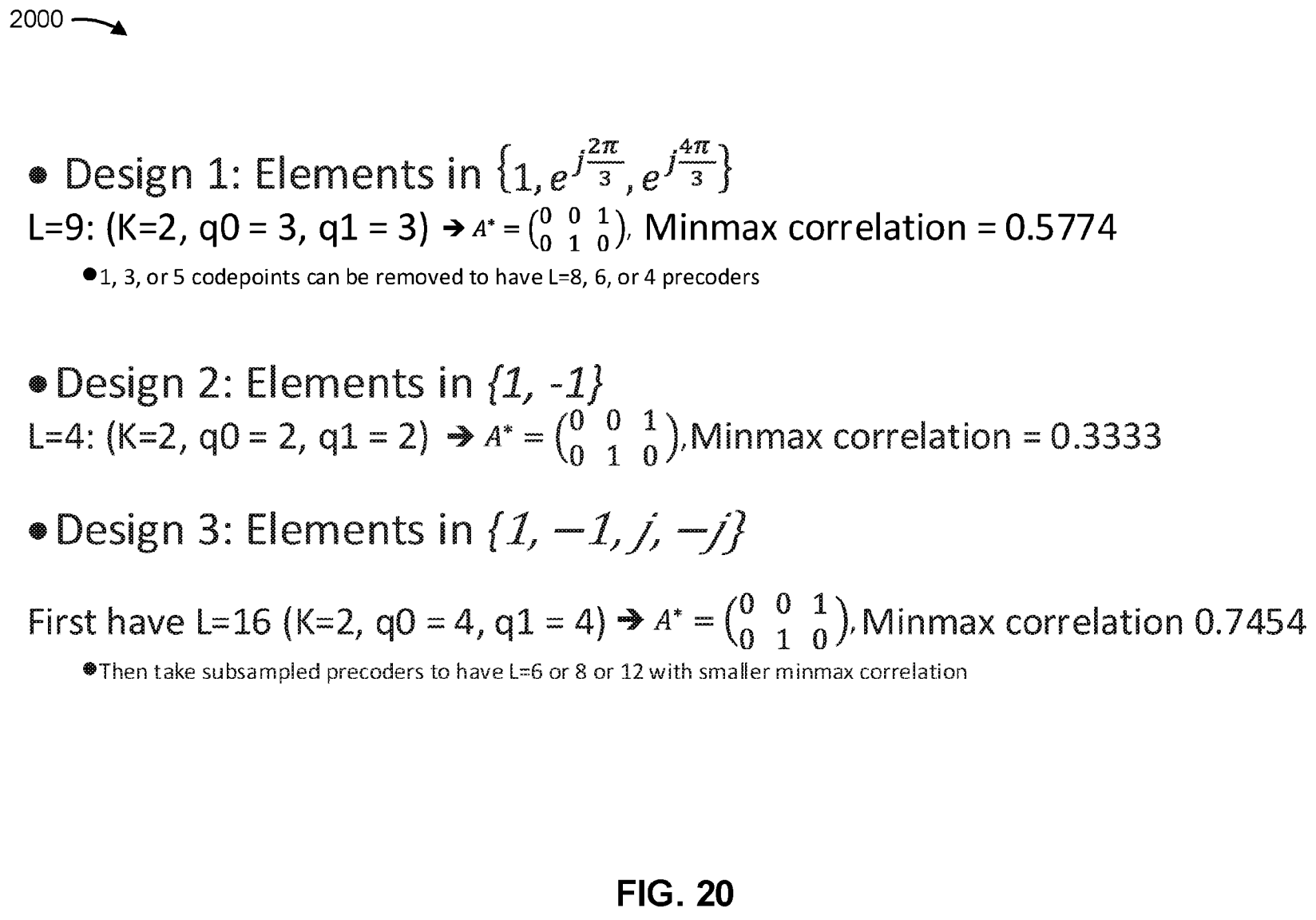

- Design 1: Elements in $\left\{1, e^{j\frac{2\pi}{3}}, e^{j\frac{4\pi}{3}}\right\}$
  L=9: (K=2, q0 = 3, q1 = 3) ➔ $A^* = \begin{pmatrix} 0 & 0 & 1 \\ 0 & 1 & 0 \end{pmatrix}$), Minmax correlation = 0.5774
  - 1, 3, or 5 codepoints can be removed to have L=8, 6, or 4 precoders

- Design 2: Elements in $\{1, -1\}$
  L=4: (K=2, q0 = 2, q1 = 2) ➔ $A^* = \begin{pmatrix} 0 & 0 & 1 \\ 0 & 1 & 0 \end{pmatrix}$), Minmax correlation = 0.3333

- Design 3: Elements in $\{1, -1, j, -j\}$

First have L=16 (K=2, q0 = 4, q1 = 4) ➔ $A^* = \begin{pmatrix} 0 & 0 & 1 \\ 0 & 1 & 0 \end{pmatrix}$), Minmax correlation 0.7454
  - Then take subsampled precoders to have L=6 or 8 or 12 with smaller minmax correlation

L=8:
(Minmax corr 0.5774, # of pairs: 21)

| $l$ | $w_l$ |
|---|---|
| 0 | $[1, 1, 1]^T$ |
| 1 | $\left[1, 1, e^{j\frac{2\pi}{3}}\right]^T$ |
| 2 | $\left[1, 1, e^{j\frac{4\pi}{3}}\right]^T$ |
| 3 | $\left[1, e^{j\frac{2\pi}{3}}, 1\right]^T$ |
| 4 | $\left[1, e^{j\frac{2\pi}{3}}, e^{j\frac{2\pi}{3}}\right]^T$ |
| 5 | $\left[1, e^{j\frac{2\pi}{3}}, e^{j\frac{4\pi}{3}}\right]^T$ |
| 6 | $\left[1, e^{j\frac{4\pi}{3}}, 1\right]^T$ |
| 7 | $\left[1, e^{j\frac{4\pi}{3}}, e^{j\frac{2\pi}{3}}\right]^T$ |
| 8 | $\left[1, e^{j\frac{4\pi}{3}}, e^{j\frac{4\pi}{3}}\right]^T$ |

L=9

| $l$ | $w_l$ | Corr. |
|---|---|---|
| 0 | $[1, 1, 1]^T$ | - |
| 1 | $\left[1, 1, e^{j\frac{2\pi}{3}}\right]^T$ | 0.5774 |
| 2 | $\left[1, 1, e^{j\frac{4\pi}{3}}\right]^T$ | 0.5774 |
| 3 | $\left[1, e^{j\frac{2\pi}{3}}, 1\right]^T$ | 0.5774 |
| 4 | $\left[1, e^{j\frac{2\pi}{3}}, e^{j\frac{2\pi}{3}}\right]^T$ | 0.5774 |
| 5 | $\left[1, e^{j\frac{3\pi}{3}}, e^{j\frac{4\pi}{3}}\right]^T$ | 0 |
| 6 | $\left[1, e^{j\frac{4\pi}{3}}, 1\right]^T$ | 0.5774 |
| 7 | $\left[1, e^{j\frac{4\pi}{3}}, e^{j\frac{2\pi}{3}}\right]^T$ | 0 |
| 8 | $\left[1, e^{j\frac{4\pi}{3}}, e^{j\frac{4\pi}{3}}\right]^T$ | 0.5774 |

FIG. 21A

L=4.
(Minmax corr 0.5774, # of pairs: 3)

| $l$ | $w_l$ | Corr. |
|---|---|---|
| 0 | $[1,1,1]^T$ | - |
| 1 | $\left[1,1,e^{j\frac{2\pi}{3}}\right]^T$ | 0.5774 |
| 2 | $\left[1,1,e^{j\frac{4\pi}{3}}\right]^T$ | 0.5774 |
| 3 | $\left[1,e^{j\frac{2\pi}{3}},1\right]^T$ | 0.5774 |
| 4 | $\left[1,e^{j\frac{2\pi}{3}},e^{j\frac{2\pi}{3}}\right]^T$ | 0.5774 |
| 5 | $\left[1,e^{j\frac{2\pi}{3}},e^{j\frac{4\pi}{3}}\right]^T$ | 0 |
| 6 | $\left[1,e^{j\frac{4\pi}{3}},1\right]^T$ | 0.5774 |
| 7 | $\left[1,e^{j\frac{4\pi}{3}},e^{j\frac{2\pi}{3}}\right]^T$ | 0 |
| 8 | $\left[1,e^{j\frac{4\pi}{3}},e^{j\frac{4\pi}{3}}\right]^T$ | 0.5774 |

L=6.
(Minmax corr 0.5774, # of pairs: 9)

| $l$ | $w_l$ | Corr. |
|---|---|---|
| 0 | $[1,1,1]^T$ | - |
| 1 | $\left[1,1,e^{j\frac{2\pi}{3}}\right]^T$ | 0.5774 |
| 2 | $\left[1,1,e^{j\frac{4\pi}{3}}\right]^T$ | 0.5774 |
| 3 | $\left[1,e^{j\frac{2\pi}{3}},1\right]^T$ | 0.5774 |
| 4 | $\left[1,e^{j\frac{2\pi}{3}},e^{j\frac{2\pi}{3}}\right]^T$ | 0.5774 |
| 5 | $\left[1,e^{j\frac{2\pi}{3}},e^{j\frac{4\pi}{3}}\right]^T$ | 0 |
| 6 | $\left[1,e^{j\frac{4\pi}{3}},1\right]^T$ | 0.5774 |
| 7 | $\left[1,e^{j\frac{4\pi}{3}},e^{j\frac{2\pi}{3}}\right]^T$ | 0 |
| 8 | $\left[1,e^{j\frac{4\pi}{3}},e^{j\frac{4\pi}{3}}\right]^T$ | 0.5774 |

| $l$ | $\mathbf{w}_l$ | Corr. |
|---|---|---|
| 0 | $[1, 1, 1]^T$ | - |
| 1 | $[1, 1, -1]^T$ | 0.3333 |
| 2 | $[1, -1, 1]^T$ | 0.3333 |
| 3 | $[1, -1, -1]^T$ | 0.3333 |

L=6:
(Minmax corr. 0.7454, # of pairs: 3)

| $i$ | $w_i$ |
|---|---|
| 0 | $[1, 1, 1]^T$ |
| 1 | $[1, 1, j]^T$ |
| 2 | $[1, 1, -1]^T$ |
| 3 | $[1, 1, -j]^T$ |
| 4 | $[1, j, 1]^T$ |
| 5 | $[1, j, j]^T$ |
| 6 | $[1, j, -1]^T$ |
| 7 | $[1, j, -j]^T$ |
| 8 | $[1, -1, 1]^T$ |
| 9 | $[1, -1, j]^T$ |
| 10 | $[1, -1, -1]^T$ |
| 11 | $[1, -1, -j]^T$ |
| 12 | $[1, -j, 1]^T$ |
| 13 | $[1, -j, j]^T$ |
| 14 | $[1, -j, -1]^T$ |
| 15 | $[1, -j, -j]^T$ |

L=8:
(Minmax corr. 0.7454, # of pairs: 8)

| $i$ | $w_i$ |
|---|---|
| 0 | $[1, 1, 1]^T$ |
| 1 | $[1, 1, j]^T$ |
| 2 | $[1, 1, -1]^T$ |
| 3 | $[1, 1, -j]^T$ |
| 4 | $[1, j, 1]^T$ |
| 5 | $[1, j, j]^T$ |
| 6 | $[1, j, -1]^T$ |
| 7 | $[1, j, -j]^T$ |
| 8 | $[1, -1, 1]^T$ |
| 9 | $[1, -1, j]^T$ |
| 10 | $[1, -1, -1]^T$ |
| 11 | $[1, -1, -j]^T$ |
| 12 | $[1, -j, 1]^T$ |
| 13 | $[1, -j, j]^T$ |
| 14 | $[1, -j, -1]^T$ |
| 15 | $[1, -j, -j]^T$ |

L=16

| $i$ | $w_i$ | Corr. |
|---|---|---|
| 0 | $[1, 1, 1]^T$ | - |
| 1 | $[1, 1, j]^T$ | 0.7454 |
| 2 | $[1, 1, -1]^T$ | 0.3333 |
| 3 | $[1, 1, -j]^T$ | 0.7454 |
| 4 | $[1, j, 1]^T$ | 0.7454 |
| 5 | $[1, j, j]^T$ | 0.7454 |
| 6 | $[1, j, -1]^T$ | 0.3333 |
| 7 | $[1, j, -j]^T$ | 0.3333 |
| 8 | $[1, -1, 1]^T$ | 0.3333 |
| 9 | $[1, -1, j]^T$ | 0.3333 |
| 10 | $[1, -1, -1]^T$ | 0.3333 |
| 11 | $[1, -1, -j]^T$ | 0.3333 |
| 12 | $[1, -j, 1]^T$ | 0.7454 |
| 13 | $[1, -j, j]^T$ | 0.3333 |
| 14 | $[1, -j, -1]^T$ | 0.3333 |
| 15 | $[1, -j, -j]^T$ | 0.7454 |

Rank 1:

| TPMI index | Precoding Matrix | | | | | | | |
|---|---|---|---|---|---|---|---|---|
| 0-7 | $\frac{1}{\sqrt{3}}\begin{bmatrix}1\\0\\0\end{bmatrix}$ | $\frac{1}{\sqrt{3}}\begin{bmatrix}0\\1\\0\end{bmatrix}$ | $\frac{1}{\sqrt{3}}\begin{bmatrix}0\\0\\1\end{bmatrix}$ | $\frac{1}{\sqrt{3}}\begin{bmatrix}1\\1\\0\end{bmatrix}$ | $\frac{1}{\sqrt{3}}\begin{bmatrix}1\\j\\0\end{bmatrix}$ | $\frac{1}{\sqrt{3}}\begin{bmatrix}1\\-1\\0\end{bmatrix}$ | $\frac{1}{\sqrt{3}}\begin{bmatrix}1\\-j\\0\end{bmatrix}$ | $\frac{1}{\sqrt{3}}\begin{bmatrix}1\\1\\1\end{bmatrix}$ |
| 8-15 | Rank 1 precoder, such as in Figs. 21A-21D | | | | | | | |

Rank 2:

| TPMI index | Precoding Matrix | | | | | | |
|---|---|---|---|---|---|---|---|
| 0-6 | $\frac{1}{\sqrt{3}}\begin{bmatrix}1&0\\0&1\\0&0\end{bmatrix}$ | $\frac{1}{\sqrt{3}}\begin{bmatrix}0&0\\1&0\\0&1\end{bmatrix}$ | $\frac{1}{\sqrt{3}}\begin{bmatrix}1&0\\0&0\\0&1\end{bmatrix}$ | $\frac{1}{\sqrt{3}}\begin{bmatrix}1&0\\1&0\\0&1\end{bmatrix}$ | $\frac{1}{\sqrt{3}}\begin{bmatrix}1&0\\j&0\\0&1\end{bmatrix}$ | $\frac{1}{\sqrt{3}}\begin{bmatrix}1&0\\-1&0\\0&1\end{bmatrix}$ | $\frac{1}{\sqrt{3}}\begin{bmatrix}1&0\\-j&0\\0&1\end{bmatrix}$ |

Rank 3:

| TPMI index | Precoding Matrix |
|---|---|
| 0 | $\frac{1}{\sqrt{3}}\begin{bmatrix}1&0&0\\0&1&0\\0&0&1\end{bmatrix}$ |

Figure 22B:
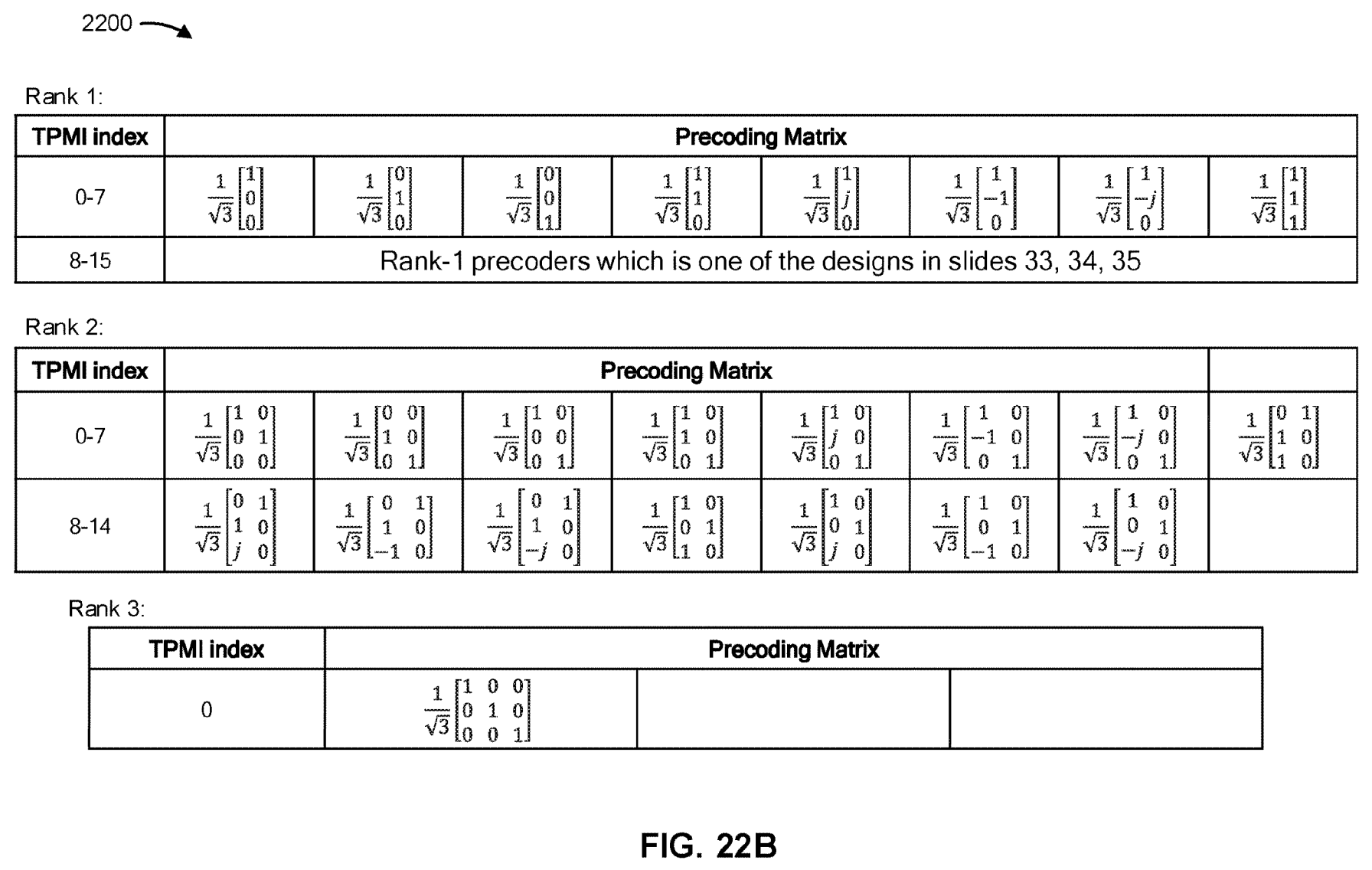

Rank 1:

| TPMI index | Precoding Matrix | | | | | | | |
|---|---|---|---|---|---|---|---|---|
| 0-7 | $\frac{1}{\sqrt{3}}\begin{bmatrix}1\\0\\0\end{bmatrix}$ | $\frac{1}{\sqrt{3}}\begin{bmatrix}0\\1\\0\end{bmatrix}$ | $\frac{1}{\sqrt{3}}\begin{bmatrix}0\\0\\1\end{bmatrix}$ | $\frac{1}{\sqrt{3}}\begin{bmatrix}1\\1\\0\end{bmatrix}$ | $\frac{1}{\sqrt{3}}\begin{bmatrix}1\\j\\0\end{bmatrix}$ | $\frac{1}{\sqrt{3}}\begin{bmatrix}1\\-1\\0\end{bmatrix}$ | $\frac{1}{\sqrt{3}}\begin{bmatrix}1\\-j\\0\end{bmatrix}$ | $\frac{1}{\sqrt{3}}\begin{bmatrix}1\\1\\1\end{bmatrix}$ |
| 8-15 | Rank-1 precoders which is one of the designs in slides 33, 34, 35 | | | | | | | |

Rank 2:

| TPMI index | Precoding Matrix | | | | |
|---|---|---|---|---|---|
| 0-7 | $\frac{1}{\sqrt{3}}\begin{bmatrix}1&0\\0&1\\0&0\end{bmatrix}$ | $\frac{1}{\sqrt{3}}\begin{bmatrix}1&0\\0&0\\0&1\end{bmatrix}$ | $\frac{1}{\sqrt{3}}\begin{bmatrix}1&0\\1&0\\0&1\end{bmatrix}$ | $\frac{1}{\sqrt{3}}\begin{bmatrix}1&0\\-1&0\\0&1\end{bmatrix}$ | $\frac{1}{\sqrt{3}}\begin{bmatrix}1&0\\j&0\\0&1\end{bmatrix}$ |
| 8-14 | $\frac{1}{\sqrt{3}}\begin{bmatrix}0&1\\1&0\\-j&0\end{bmatrix}$ | $\frac{1}{\sqrt{3}}\begin{bmatrix}0&1\\1&0\\-1&0\end{bmatrix}$ | $\frac{1}{\sqrt{3}}\begin{bmatrix}1&0\\0&1\\j&0\end{bmatrix}$ | $\frac{1}{\sqrt{3}}\begin{bmatrix}1&0\\-j&0\\0&1\end{bmatrix}$ | $\frac{1}{\sqrt{3}}\begin{bmatrix}1&0\\0&1\\1&0\end{bmatrix}$ |

Rank 3:

| TPMI index | Precoding Matrix | |
|---|---|---|
| 0 | $\frac{1}{\sqrt{3}}\begin{bmatrix}1&0&0\\0&1&0\\0&0&1\end{bmatrix}$ | |

Up to 3 Layers

| Third CSR | | Second CSR | | First CSR | |
|---|---|---|---|---|---|
| TPMI Bit field mapped to index | codebookSubset = FC | TPMI Bit field mapped to index | codebookSubset = PC | TPMI Bit field mapped to index | codebookSubset = NC |
| 0 | 1 layer: TPMI=7 | 0 | 1 layer: TPMI=3 | 0 | 1 layer: TPMI=0 |
| 1 | 1 layer: TPMI=8 | 1 | 1 layer: TPMI=4 | 1 | 1 layer: TPMI=1 |
| ... | ... | 2 | 1 layer: TPMI=5 | 2 | 1 layer: TPMI=2 |
| L-1 | 1 layers: TPMI=L+6 | 3 | 1 layers: TPMI=6 | 3 | 2 layers: TPMI=0 |
| L | 2 layers: TPMI=3 | 4 | 2 layers: TPMI=3 | 4 | 2 layers: TPMI=1 |
| L+1 | 2 layer: TPMI=4 | 5 | 2 layer: TPMI=4 | 5 | 2 layers: TPMI=2 |
| L+2 | 2 layer: TPMI=5 | 6 | 2 layer: TPMI=5 | 6 | 3 layers: TPMI=0 |
| L+3 | 2 layer: TPMI=6 | 7 | 2 layer: TPMI=6 | | |
| L+4 | 3 layers: TPMI=0 | 8 | 3 layers: TPMI=0 | | |

Up to 1 Layer

| Third CSR | | Second CSR | | First CSR | |
|---|---|---|---|---|---|
| TPMI Bit field mapped to index | codebookSubset = FC | TPMI Bit field mapped to index | codebookSubset = PC | TPMI Bit field mapped to index | codebookSubset = NC |
| 0 | 1 layer: TPMI=7 | 0 | 1 layer: TPMI=3 | 0 | 1 layer: TPMI=0 |
| 1 | 1 layer: TPMI=8 | 1 | 1 layer: TPMI=4 | 1 | 1 layer: TPMI=1 |
| ... | ... | 2 | 1 layer: TPMI=5 | 2 | 1 layer: TPMI=2 |
| L-1 | 1 layers: TPMI=L+6 | 3 | 1 layers: TPMI=6 | | |

Figure 23B:
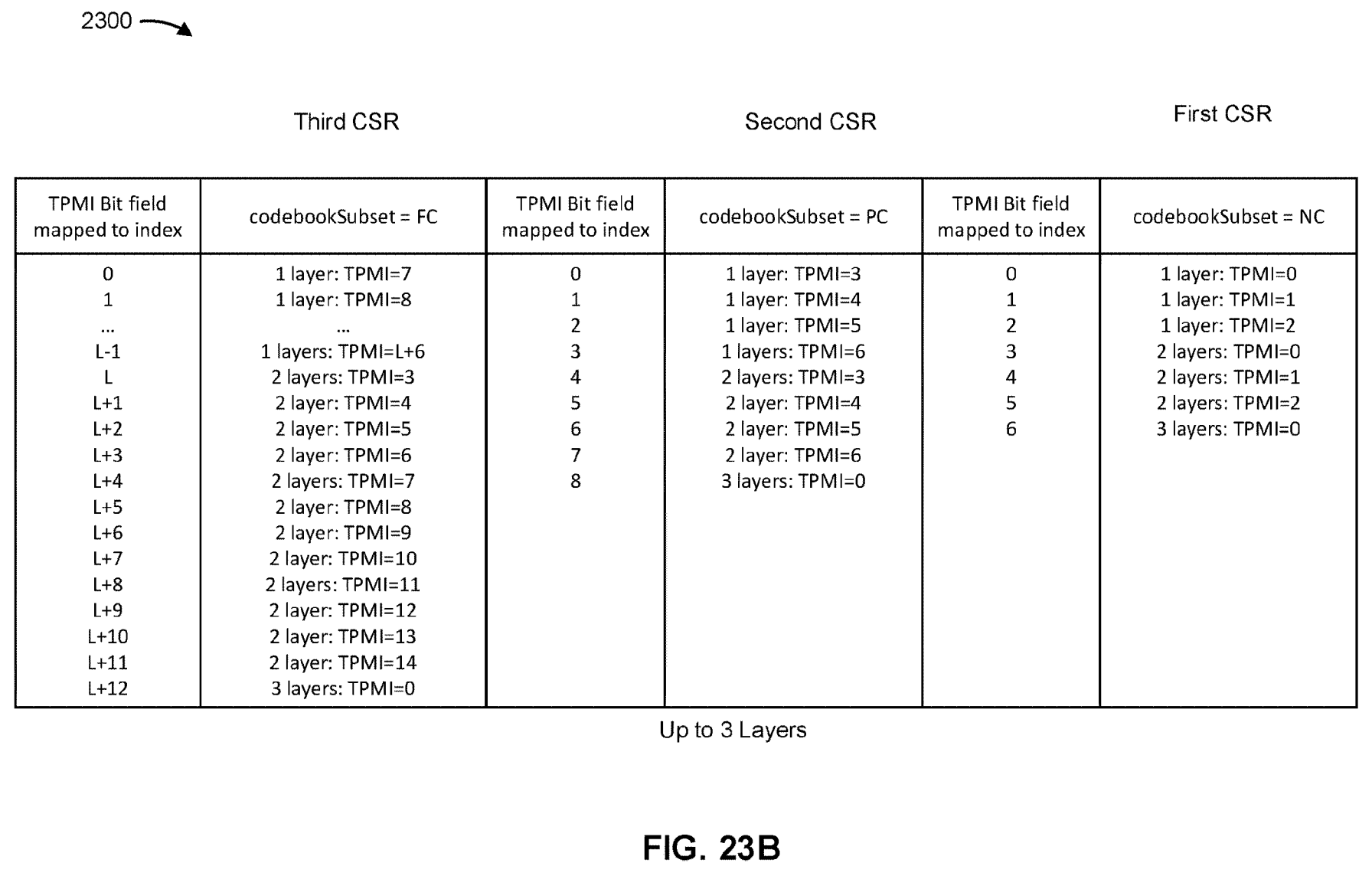

Third CSR

| TPMI Bit field mapped to index | codebookSubset = FC |
|---|---|
| 0 | 1 layer: TPMI=7 |
| 1 | 1 layer: TPMI=8 |
| ... | ... |
| L-1 | 1 layers: TPMI=L+6 |
| L | 2 layers: TPMI=3 |
| L+1 | 2 layer: TPMI=4 |
| L+2 | 2 layer: TPMI=5 |
| L+3 | 2 layer: TPMI=6 |
| L+4 | 2 layers: TPMI=7 |
| L+5 | 2 layer: TPMI=8 |
| L+6 | 2 layer: TPMI=9 |
| L+7 | 2 layer: TPMI=10 |
| L+8 | 2 layers: TPMI=11 |
| L+9 | 2 layer: TPMI=12 |
| L+10 | 2 layer: TPMI=13 |
| L+11 | 2 layer: TPMI=14 |
| L+12 | 3 layers: TPMI=0 |

Second CSR

| TPMI Bit field mapped to index | codebookSubset = PC |
|---|---|
| 0 | 1 layer: TPMI=3 |
| 1 | 1 layer: TPMI=4 |
| 2 | 1 layer: TPMI=5 |
| 3 | 1 layers: TPMI=6 |
| 4 | 2 layers: TPMI=3 |
| 5 | 2 layer: TPMI=4 |
| 6 | 2 layer: TPMI=5 |
| 7 | 2 layer: TPMI=6 |
| 8 | 3 layers: TPMI=0 |

First CSR

| TPMI Bit field mapped to index | codebookSubset = NC |
|---|---|
| 0 | 1 layer: TPMI=0 |
| 1 | 1 layer: TPMI=1 |
| 2 | 1 layer: TPMI=2 |
| 3 | 2 layers: TPMI=0 |
| 4 | 2 layers: TPMI=1 |
| 5 | 2 layers: TPMI=2 |
| 6 | 3 layers: TPMI=0 |

Up to 3 Layers

| Third CSR | | Second CSR | | First CSR | |
|---|---|---|---|---|---|
| TPMI Bit field mapped to index | codebookSubset = FC+PC+NC | TPMI Bit field mapped to index | codebookSubset = PC+NC | TPMI Bit field mapped to index | codebookSubset = NC |
| 0 | 1 layer: TPMI=0 | 0 | 1 layer: TPMI=0 | 0 | 1 layer: TPMI=0 |
| 1 | 1 layer: TPMI=1 | 1 | 1 layer: TPMI=1 | 1 | 1 layer: TPMI=1 |
| 2 | 1 layer: TPMI=2 | 2 | 1 layer: TPMI=2 | 2 | 1 layer: TPMI=2 |
| 3 | 2 layers: TPMI=0 | 3 | 2 layers: TPMI=0 | 3 | 2 layers: TPMI=0 |
| 4 | 2 layers: TPMI=1 | 4 | 2 layers: TPMI=1 | 4 | 2 layers: TPMI=1 |
| 5 | 2 layers: TPMI=2 | 5 | 2 layers: TPMI=2 | 5 | 2 layers: TPMI=2 |
| 6 | 3 layers: TPMI=0 | 6 | 3 layers: TPMI=0 | 6 | 3 layers: TPMI=0 |
| 7 | 1 layer: TPMI=3 | 7 | 1 layer: TPMI=3 | | |
| 8 | 1 layer: TPMI=4 | 8 | 1 layer: TPMI=4 | | |
| 9 | 1 layer: TPMI=5 | 9 | 1 layer: TPMI=5 | | |
| 10 | 1 layers: TPMI=6 | 10 | 1 layers: TPMI=6 | | |
| 11 | 2 layers: TPMI=3 | 11 | 2 layers: TPMI=3 | | |
| 12 | 2 layer: TPMI=4 | 12 | 2 layer: TPMI=4 | | |
| 13 | 2 layer: TPMI=5 | 13 | 2 layer: TPMI=5 | | |
| 14 | 2 layer: TPMI=6 | 14 | 2 layer: TPMI=6 | | |
| 15 ~ (15 + L - 1) | 1 layers: TPMI=7 ~ (L + 6) | | | | |

Up to 3 Layers

| Third CSR | | Second CSR | | First CSR | |
|---|---|---|---|---|---|
| TPMI Bit field mapped to index | codebookSubset = FC+PC+NC | TPMI Bit field mapped to index | codebookSubset = PC+NC | TPMI Bit field mapped to index | codebookSubset = NC |
| 0 | 1 layer: TPMI=0 | 0 | 1 layer: TPMI=0 | 0 | 1 layer: TPMI=0 |
| 1 | 1 layer: TPMI=1 | 1 | 1 layer: TPMI=1 | 1 | 1 layer: TPMI=1 |
| 2 | 1 layer: TPMI=2 | 2 | 1 layer: TPMI=2 | 2 | 1 layer: TPMI=2 |
| 3 | 2 layers: TPMI=0 | 3 | 2 layers: TPMI=0 | 3 | 2 layers: TPMI=0 |
| 4 | 2 layers: TPMI=1 | 4 | 2 layers: TPMI=1 | 4 | 2 layers: TPMI=1 |
| 5 | 2 layers: TPMI=2 | 5 | 2 layers: TPMI=2 | 5 | 2 layers: TPMI=2 |
| 6 | 3 layers: TPMI=0 | 6 | 3 layers: TPMI=0 | 6 | 3 layers: TPMI=0 |
| 7 | 1 layer: TPMI=3 | | 1 layer: TPMI=3 | | |
| 8 | 1 layer: TPMI=4 | | 1 layer: TPMI=4 | | |
| 9 | 1 layer: TPMI=5 | | 1 layer: TPMI=5 | | |
| 10 | 1 layers: TPMI=6 | | 1 layers: TPMI=6 | | |
| 11 | 2 layers: TPMI=3 | | 2 layers: TPMI=3 | | |
| 12 | 2 layer: TPMI=4 | | 2 layer: TPMI=4 | | |
| 13 | 2 layer: TPMI=5 | | 2 layer: TPMI=5 | | |
| 14 | 2 layer: TPMI=6 | | 2 layer: TPMI=6 | | |
| 15 ~ (15 + L - 1) | 1 layers: TPMI=7 ~ (L + 6) | | | | |
| 15 + L | 2 layers: TPMI=7 | | | | |
| 15 + L + 1 | 2 layers: TPMI=8 | | | | |
| ... | ... | | | | |
| 15 + L + 7 | 2 layers: TPMI=14 | | | | |

Up to 3 Layers

| | Third CSR | | Second CSR | | First CSR |
| --- | --- | --- | --- | --- | --- |
| TPMI Bit field mapped to index | codebookSubset = FC+PC+NC | TPMI Bit field mapped to index | codebookSubset = PC+NC | TPMI Bit field mapped to index | codebookSubset = NC |
| 0 | 1 layer: TPMI=0 | 0 | 1 layer: TPMI=0 | 0 | 1 layer: TPMI=0 |
| 1 | 1 layer: TPMI=1 | 1 | 1 layer: TPMI=1 | 1 | 1 layer: TPMI=1 |
| 2 | 1 layer: TPMI=2 | 2 | 1 layer: TPMI=2 | 2 | 1 layer: TPMI=2 |
| 3 | 1 layer: TPMI=3 | 3 | 1 layer: TPMI=3 | | |
| 4 | 1 layer: TPMI=4 | 4 | 1 layer: TPMI=4 | | |
| 5 | 1 layer: TPMI=5 | 5 | 1 layer: TPMI=5 | | |
| 6 | 1 layers: TPMI=6 | 6 | 1 layers: TPMI=6 | | |
| 7 ~ (7 + L - 1) | 1 layers: TPMI=7 ~ (L + 6) | | | | |

Up to 1 Layer

FIG. 23E

TECHNIQUES FOR CODEBOOK AND CONTROL SIGNALING FOR UPLINK

CROSS-REFERENCE TO RELATED APPLICATION

This Patent Application is a 371 National Stage of Patent Cooperation Treaty (PCT) Patent Application No. PCT/CN2021/116416, filed on Sep. 3, 2021, entitled "TECHNIQUES FOR CODEBOOK AND CONTROL SIGNALING FOR UPLINK," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for codebook and control signaling for uplink.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving signaling identifying a transmission precoding matrix indicator associated with a transmit codebook configured for three antenna ports. The method may include transmitting an uplink communication in accordance with the transmit codebook configured for three antenna ports.

Some aspects described herein relate to a UE for wireless communication. The UE may include a memory and one or more processors coupled to the memory. The one or more processors may be configured to receive signaling identifying a transmission precoding matrix indicator associated with a transmit codebook configured for three antenna ports. The one or more processors may be configured to transmit an uplink communication in accordance with the transmit codebook configured for three antenna ports.

Some aspects described herein relate to a non-transitory computer-readable medium that stores a set of instructions for wireless communication by a UE. The set of instructions, when executed by one or more processors of the UE, may cause the UE to receive signaling identifying a transmission precoding matrix indicator associated with a transmit codebook configured for three antenna ports. The set of instructions, when executed by one or more processors of the UE, may cause the UE to transmit an uplink communication in accordance with the transmit codebook configured for three antenna ports.

Some aspects described herein relate to an apparatus for wireless communication. The apparatus may include means for receiving signaling identifying a transmission precoding matrix indicator associated with a transmit codebook configured for three antenna ports. The apparatus may include means for transmitting an uplink communication in accordance with the transmit codebook configured for three antenna ports.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example of forming a virtual antenna port by combining non-coherent and/or partially-coherent antenna ports, in accordance with the present disclosure.

FIGS. 8-23E are diagrams illustrating examples associated with codebook and control signaling for uplink, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
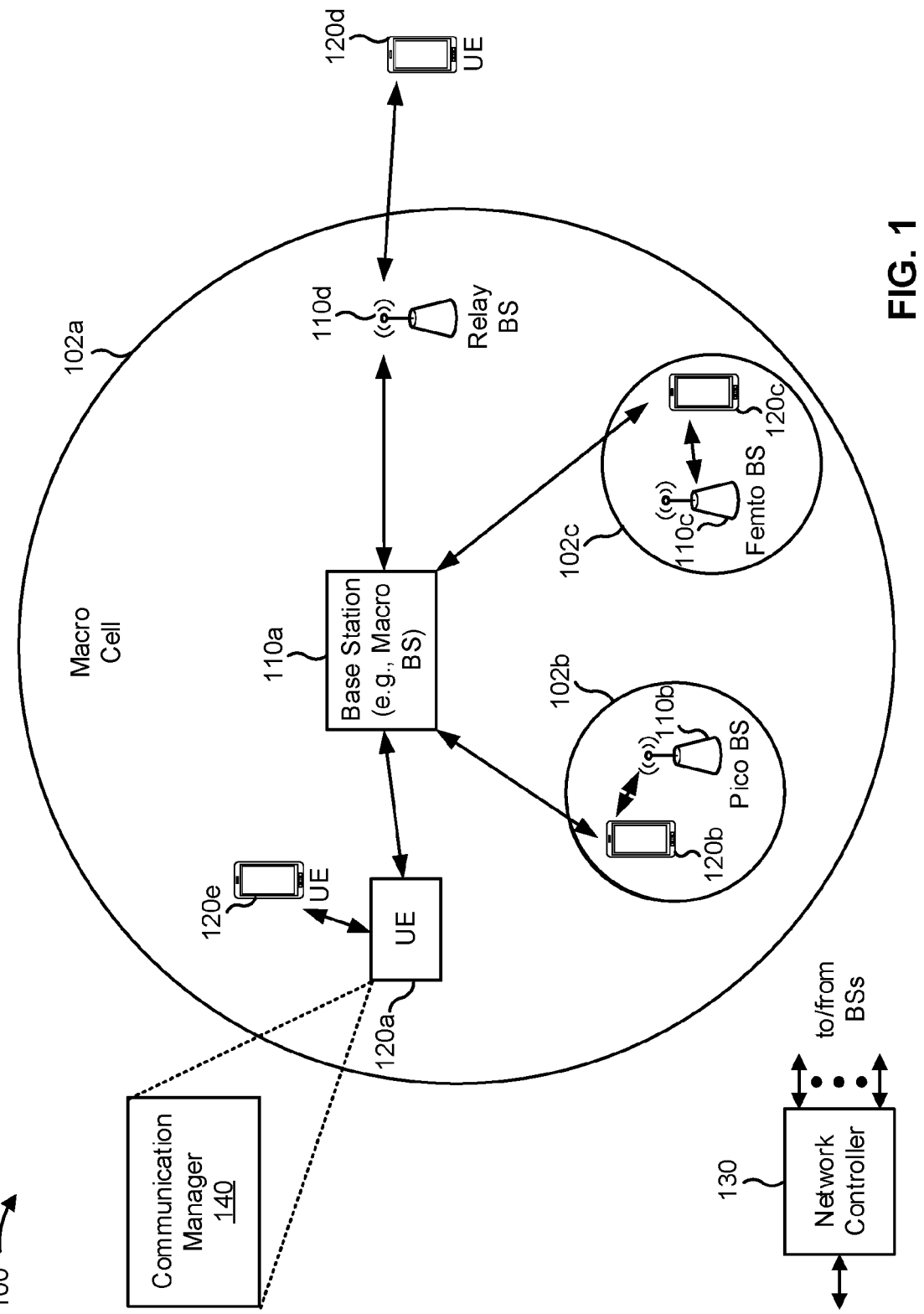
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive signaling identifying a transmission precoding matrix indicator associated with a transmit codebook configured for three antenna ports; and transmit an uplink communication in accordance with the transmit codebook configured for three antenna ports. Additionally, or alternatively, the communication manager 140 may perform one or more other operations described herein.

As indicated above, FIG. 1 is provided as an example. Other examples may differ from what is described with regard to FIG. 1.

Figure 2:
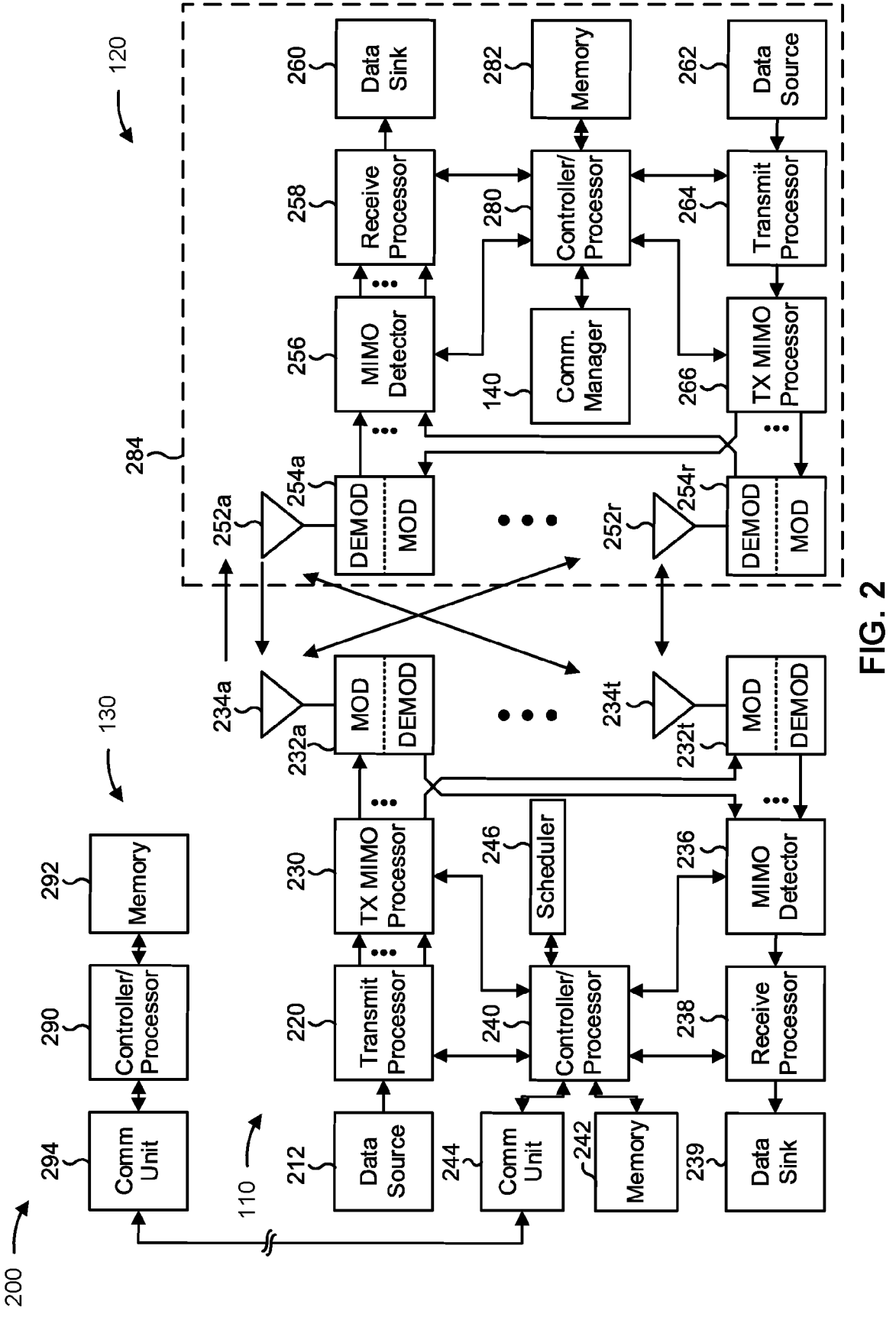
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode)

the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-23E).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-23E).

The controller/processor 240 of the base station 110, the controller/processor 280 of the UE 120, and/or any other component(s) of FIG. 2 may perform one or more techniques associated with codebook and control signaling for uplink, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6 and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6 and/or other processes as described herein. In some examples, executing instructions may include running the instructions, converting the instructions, compiling the instructions, and/or interpreting the instructions, among other examples.

In some aspects, the UE 120 includes means for receiving signaling identifying a transmission precoding matrix indicator associated with a transmit codebook configured for three antenna ports; and/or means for transmitting an uplink communication in accordance with the transmit codebook configured for three antenna ports. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
FIG. 3 is a diagram illustrating an example of antenna ports, in accordance with the present disclosure.

FIG. 3 is a diagram illustrating an example 300 of antenna ports, in accordance with the present disclosure.

As shown in FIG. 3, a first physical antenna 305-1 may transmit information via a first channel h1, a second physical antenna 305-2 may transmit information via a second channel h2, a third physical antenna 305-3 may transmit information via a third channel h3, and a fourth physical antenna 305-4 may transmit information via a fourth channel h4. Such information may be conveyed via a logical antenna port, which may represent some combination of the physical antennas and/or channels. In some cases, a UE 120 may not have knowledge of the channels associated with the physical antennas, and may only operate based on knowledge of the channels associated with antenna ports, as defined below.

An antenna port may be defined such that a channel, over which a symbol on the antenna port is conveyed, can be inferred from a channel over which another symbol on the same antenna port is conveyed. In example 300, a channel associated with antenna port 1 (AP1) is represented as h1−h2+h3+j*h4, where channel coefficients (e.g., 1, −1, 1, and j, in this case) represent weighting factors (e.g., indicating phase and/or gain) applied to each channel. Such weighting factors may be applied to the channels to improve signal power and/or signal quality at one or more receivers.

Applying such weighting factors to channel transmissions may be referred to as precoding, and a precoder may refer to a specific set of weighting factors applied to a set of channels.

Similarly, a channel associated with antenna port 2 (AP2) is represented as h1+j*h3, and a channel associated with antenna port 3 (AP3) is represented as 2*h1−h2+(1+j)*h3+ j*h4. In this case, antenna port 3 can be represented as the sum of antenna port 1 and antenna port 2 (e.g., AP3=AP1+ AP2) because the sum of the expression representing antenna port 1 (h1−h2+h3+j*h4) and the expression representing antenna port 2 (h1+j*h3) equals the expression representing antenna port 3 (2*h1−h2+(1+j)*h3+j*h4). It can also be said that antenna port 3 is related to antenna ports 1 and 2 [AP1,AP2] via the precoder [1,1] because 1 times the expression representing antenna port 1 plus 1 times the expression representing antenna port 2 equals the expression representing antenna port 3.

Some UEs may have more than four antenna ports. For example, a UE may have 6 antenna ports, 8 antenna ports, or a greater quantity of antenna ports. Similarly, some UEs may have fewer antenna ports, such as having two antenna ports or one antenna port. Using greater quantities of antenna ports and associated radio frequency (RF) transmit (Tx) chains can improve uplink performance in terms of throughput. However, greater quantities of antenna ports and associated RF Tx chains may also increase thermal management issues, resulting in a need for greater thermal mitigation and/or damage to components.

As indicated above, FIG. 3 is provided merely as an example. Other examples may differ from what is described with regard to FIG. 3.

FIG. 4 is a diagram illustrating two examples 400 of forming a virtual antenna port by combining non-coherent and/or partially-coherent antenna ports, in accordance with the present disclosure.

The antennas of a multi-antenna UE (e.g., UE 120) may be classified into one of three groups depending on coherence of the antenna ports of the UE. A set of antenna ports (for example, two antenna ports) are coherent if the relative phase among the set of antenna ports (for example, between the two antenna ports) remains the same between the time of a sounding reference signal (SRS) transmission from those antenna ports and a subsequent physical uplink shared channel (PUSCH) transmission from those antenna ports. In this case, the SRS may be used (for example, by the UE or a base station) to determine an uplink precoder for precoding the PUSCH transmission, because the relative phase of the antenna ports will be the same for the SRS transmission and the PUSCH transmission. The precoding may span across the set of coherent antenna ports.

Precoding is a technique that exploits transmit diversity by multiplying a data stream (layer) with beamforming weights for each antenna, of a set of transmit antennas, prior to transmission. Precoding may include mapping multiple individual layers to multiple antennas. A (precoding matrix) codebook, which may also be referred to as a "transmit codebook," may be a matrix of vector values (channel coefficients) that are used for the precoding. A rank of a codebook may correspond to a quantity of layers. For example, a rank 1 codebook may be for one layer (data stream), a rank 2 codebook may be for two layers, and a rank 4 codebook may be for 4 layers. Thus far, codebooks for 1, 2, or 4 antenna ports have been supported. Codebook designs for some other quantities of antenna ports have not been supported.

If a set of antenna ports is non-coherent, then such uplink precoder determination becomes difficult, because the relative phase between the antenna ports will change from the SRS transmission to the PUSCH transmission. For example, a set of antenna ports is considered non-coherent if the relative phase among the set of antenna ports is different for the SRS transmission than for the PUSCH transmission. In this case, the use of the same uplink precoder for a set of non-coherent antenna ports may result in the UE applying improper or inaccurate precoding weights (such as phase and gain weights) to the data streams transmitted from the non-coherent antenna ports. Furthermore, a set of antenna ports is considered partially-coherent if a first subset of the set of antenna ports is coherent with one another and a second subset of the set of antenna ports is coherent with one another, but the first subset of antenna ports and the second subset of antenna ports are not coherent with one another. In this case, common precoding may be used within each of the respective subsets of coherent antenna ports, but not across the different subsets of non-coherent antenna ports.

In some cases, when a base station schedules a PUSCH transmission for a multi-antenna UE having non-coherent or partially-coherent antenna ports, the signaling communication that schedules the PUSCH transmission may identify an uplink precoder that is to be used to precode the PUSCH transmission. Because the antenna ports of the UE are non-coherent (or, in the case of partially coherent antenna ports, are non-coherent groups of coherent antenna ports), the UE may be capable of using the uplink precoder for only one of the antenna ports (or antenna port groups) while other antenna ports (or antenna port groups) are not used for the PUSCH transmission. Because only a subset of non-coherent or partially coherent antenna ports are used, this may result in decreased transmit power of the PUSCH transmission, decreased reliability of the PUSCH transmission (due to lack of transmit or spatial diversity), or the like.

To utilize some or all of the non-coherent or partially coherent antenna ports, the UE may apply various techniques to synthesize non-coherent or partially coherent antenna ports into a virtual antenna port so that common precoding may be used on the virtual antenna port and applied across the non-coherent antenna ports. A virtual (or logical) antenna port may represent a combination of two or more antenna ports. This allows a base station to select an uplink precoder for the virtual antenna port, and allows the UE to use the uplink precoder to transmit on the otherwise non-coherent or partially coherent antenna ports that have been combined to form the virtual antenna port.

For example, as shown by reference number 405, a set of non-coherent antenna ports (e.g., shown as two non-coherent antenna ports) can be combined into a single virtual port using precoding (e.g., uplink precoding) and cyclic delay diversity. The precoder may be determined by the UE 120 and/or signaled by a base station 110. Cyclic delay diversity (CDD) may refer to a technique where a delay (e.g., a cyclic delay) is introduced on one of the non-coherent antenna ports and not the other non-coherent antenna port. In some examples, the delay may be measured in samples (e.g., 5 samples, 10 samples, or another quantity of samples) or fractions of samples. For example, a first non-coherent antenna port may transmit a first stream of samples, and the second non-coherent antenna port may transmit a second stream of samples (e.g., which may be the same stream) with a slight cyclic delay (e.g., a delay of 5 samples, 10 samples, or another quantity of samples). For example, for a cyclic delay of 5 samples, where 16 samples are transmitted per symbol, the first non-coherent antenna port may transmit the 16 samples with a first sample transmitted first (e.g., [s1, s2, s3, s4, ..., s16]), and the second non-coherent antenna port may transmit the 16 samples with the first sample transmitted sixth (e.g., with a delay of five samples) (e.g., [s12, s13, s14, s15, s16, s1, s2, s3, ..., s11]).

Additionally, or alternatively, as shown by reference number 410, a set of partially-coherent antenna ports can be combined into a single virtual antenna port using precoding (e.g., uplink precoding) and cyclic delay diversity, in a similar manner as described above. As shown, a first subset of antenna ports may be coherent with one another, and a second subset of antenna ports may be coherent with one another, but the two subsets may not be coherent with one another. As further shown, precoding may be applied to the individual subsets to generate a first virtual antenna port and a second virtual antenna port that are not coherent with one another. Then, CDD may be applied to these two virtual antenna ports (e.g., by transmitting communications from the virtual antenna ports using CDD), thereby forming a single virtual antenna port from the partially-coherent antenna ports (e.g., using precoding and CDD).

Although FIG. 4 shows pairs of antenna ports in sets and subsets, in some aspects, a different number of antenna ports may be included in a set or a subset. For example, a set of antenna ports or subset of antenna ports may include three antenna ports, four antenna ports, or another quantity of antenna ports.

As indicated above, FIG. 4 is provided as one or more examples. Other examples are possible and may differ from what is described with regard to FIG. 4.

As described above, codebooks may be used for different quantities of antennas and antenna ports. For example, efficient codebooks are supported for one transmit antenna port or two transmit antenna ports. To support improved throughput or reliability, some UEs may be configured with a codebook for four antenna ports for uplink. However, using four or more antennas may result in excess thermal generation. According to some aspects described herein, a wireless communication device may select a transmit codebook for three antenna ports, which provides support for three transmit layers in uplink multiple-input multiple-output (MIMO) transmission. By supporting three transmit layers for uplink MIMO, a UE achieves improved throughput and reliability relative to using a codebook for one antenna port or two antenna ports (corresponding to one uplink MIMO layer or two uplink MIMO layers, respectively). Further, by supporting three transmit layers for uplink MIMO, the UE reduces a need for thermal mitigation and a negative impact of excess thermal generation relative to using four or more antenna ports (corresponding to four or more uplink MIMO layers). In this way, the UE may be deployed in use cases where two transmit antennas is insufficient, but four transmit antennas is excessive.

Figure 5:
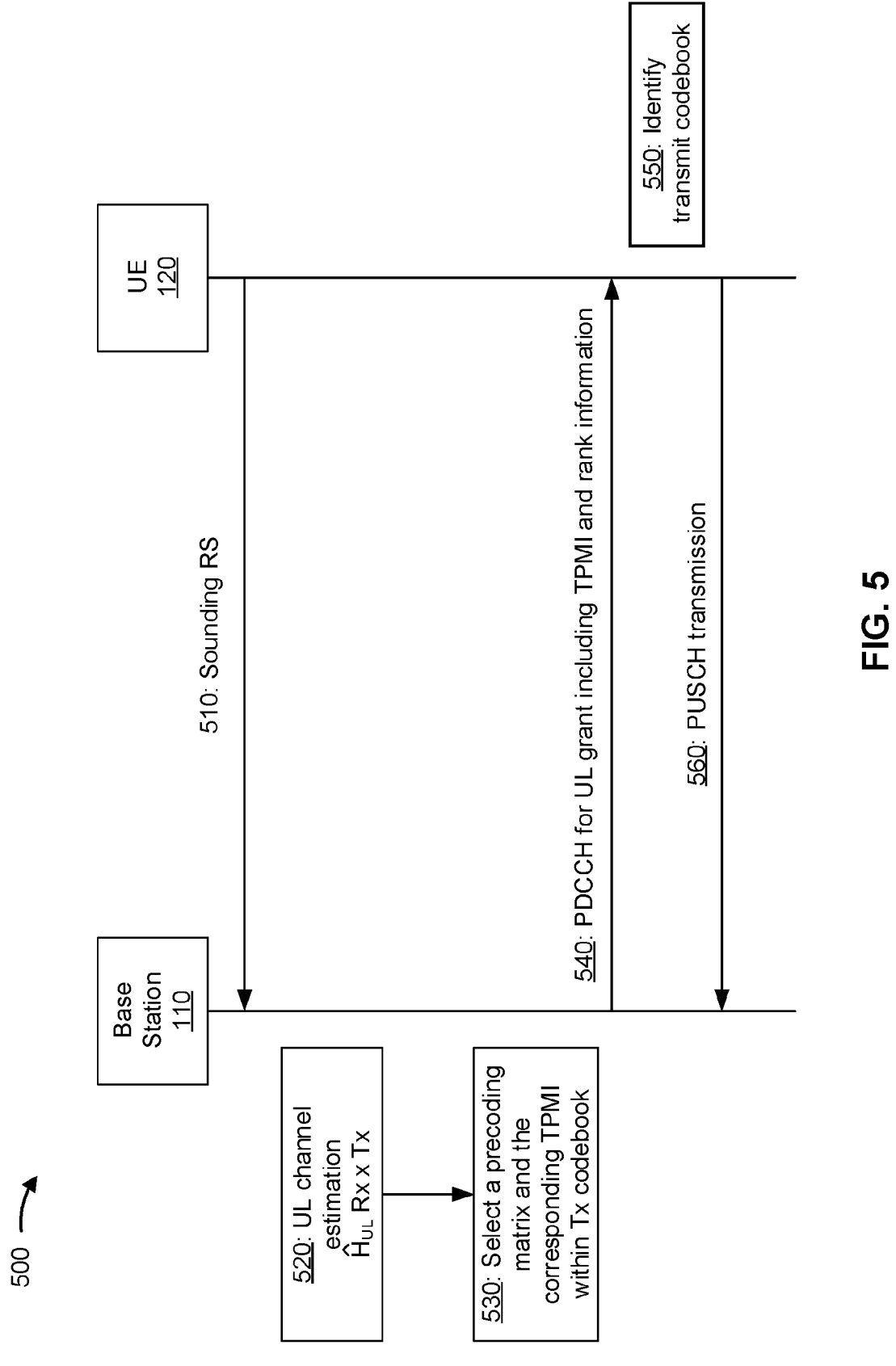
FIG. 5 is a diagram illustrating an example associated with codebook and control signaling for uplink, in accordance with the present disclosure.

FIG. 5 is a diagram illustrating an example 500 associated with codebook and control signaling for uplink, in accordance with the present disclosure. As shown in FIG. 5, example 500 includes communication between a base station 110 and a UE 120. In some aspects, base station 110 and UE 120 may be included in a wireless network, such as wireless network 100. Base station 110 and UE 120 may communicate via a wireless access link, which may include an uplink and a downlink. Further, FIGS. 8-23E are provided as illustrative examples 800-2300, which may be used in connection with example 500. Other examples may differ from what is described with respect to FIGS. 8-23E.

As further shown in FIG. 5, and by reference number 510, UE 120 may transmit a sounding reference signal (SRS). For example, UE 120 may transmit the sounding reference signal using a set of antenna ports of UE 120 to enable base station 110 to perform one or more measurements of one or more channels associated with the set of antenna ports. Base station 110 may receive the sounding reference signal and perform the one or more measurements. As shown by reference number 520, base station 110 may perform uplink channel estimation and, as shown by reference number 530, select a precoding matrix and corresponding transmission precoding matrix indicator (TPMI) associated with a transmit (Tx) codebook. For example, based at least in part on receiving the sounding reference signal, base station 110 may perform uplink channel estimation to determine an uplink channel matrix HUL. Based at least in part on the uplink channel matrix, base station 110 may select a precoding matrix for and a corresponding TPMI associated with a transmit codebook configured for three antenna ports, which UE 120 may use for uplink transmission (e.g., of a physical uplink shared channel (PUSCH)), as described in more detail herein. As shown by reference number 540, base station 110 may transmit, and UE 120 may receive, signaling identifying the TPMI associated with the transmit codebook and a rank indicator (RI) identifying rank information. For example, base station 110 may transmit a physical downlink control channel (PDCCH) message that identifies an uplink grant. In this case, the PDCCH may include, and the uplink grant may be associated with, a TPMI value in a TMPI field and a rank indicator value in a rank indicator field.

As further shown in FIG. 5, and by reference number 550, UE 120 may identify a transmit codebook and precode a communication in accordance with the transmit codebook and/or the rank indicator. As shown by reference number 560, UE 120 may transmit the communication. For example, using a resource of the uplink grant and a transmit codebook associated with the TPMI and/or the rank indicator, UE 120 may transmit a PUSCH communication to base station 110 in accordance with the selected precoding matrix. In this way, UE 120 transmits a communication using the transmit codebook configured for three antenna ports, which may be referred to as a "3 Tx codebook," and base station 110 is enabled to decode the communication.

In some aspects, UE 120 may precode the communication using a particular type of coherency, such as by using a non-coherent (NC) 3 Tx codebook, a partially coherent (PC) 3 Tx codebook, or a fully coherent (FC) 3 Tx codebook. For example, referring to FIG. 8, an NC 3 Tx codebook may have 7 possible precoders covering ranks 1 through 3, such as 3 precoders for rank 1, 3 precoders for rank 2, and 1 precoder for rank 3. In this case, UE 120 may select a group of precoders based at least in part on a received RI and a particular precoder from the group of precoders based at least in part on a received TPMI.

Figure 9B:
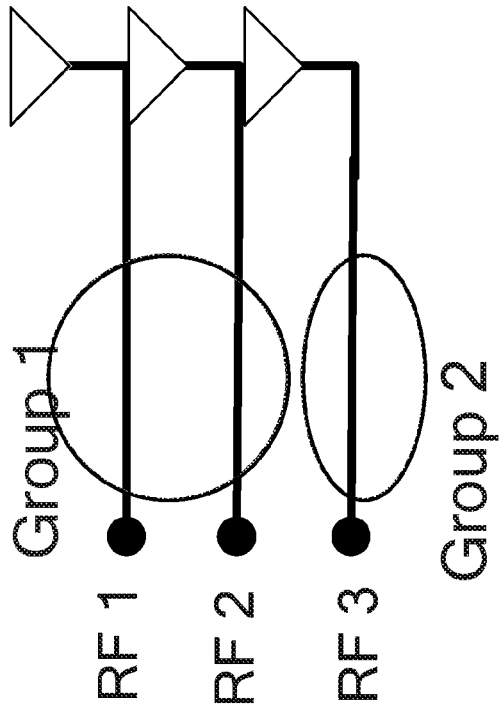
Figure 10:
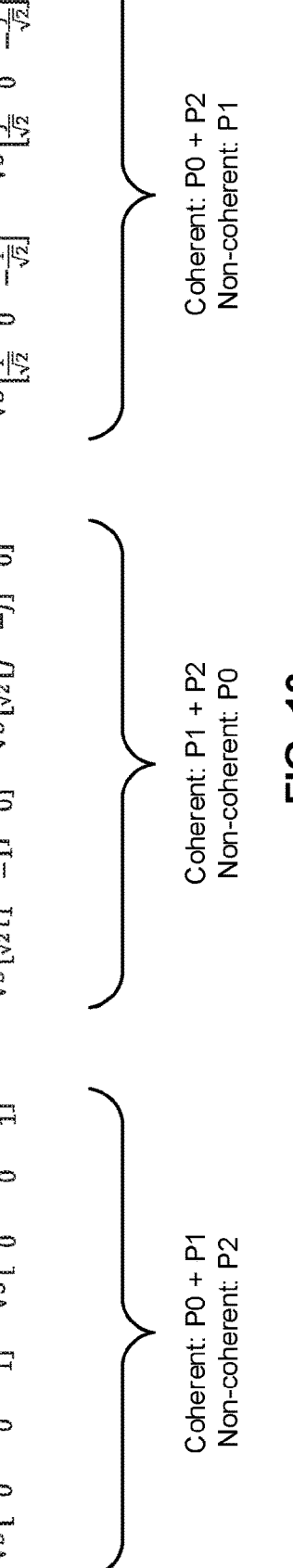

Similarly, referring to FIG. 9A, a PC 3 Tx codebook may have 10 precoders covering ranks 1 through 3, such as 4 precoders for rank 1, 4 precoders for rank 2, and 2 precoders for rank 3. Referring to FIG. 9B, in partial coherency, RF Tx chains are grouped such that two RF Tx chains are coherent with each other, but a third RF Tx chain is not coherent with the two RF Tx chains. In other words, in partial coherency for 3 Tx, RF 1 (for a first antenna port P0) and RF 2 (for a second antenna port P1) are coherent with each other, but RF 3 (for a third antenna port P3) is not coherent with RF 1 or RF 2. FIGS. 9A and 9B show an example of a PC 3 Tx codebook with a fixed port grouping (e.g., a first antenna port P0 is coherent with a second antenna port P1, but a third antenna port P2 is not coherent with the first antenna port P0 or the second antenna port P1). In another example, UE 120 may be configured with a PC 3 Tx codebook that allows any combination of partial coherency. For example, referring to FIG. 10, a first combination of partial coherency may have the first antenna port P0 and the second antenna port P1 coherent and the third antenna port P2 non-coherent, a second combination of partial coherency may have the second antenna port P1 and the third antenna port P2 coherent and the first antenna port P0 non-coherent, and a third combination of partial coherency may have the first antenna port P0 and the third antenna port P2 coherent and the second antenna port P1 non-coherent. In this case, the PC 3 Tx codebook may have 12 precoders for rank 1, 12 precoders for rank 2, and 6 precoders for rank 3, totaling 30 precoders for the PC 3 Tx codebook.

In some aspects, UE 120 may use a 3 Tx fully coherent codebook for precoding. A 3 Tx fully coherent codebook may be constructed based at least in part on a scaled version of a complex Householder matrix which has a form:

$$W_l = \gamma\left(I - \frac{\left(1 - e^{j\theta_N}\right)}{u_l^H u_l} u_l u_l^H\right) \tag{1}$$

$$u_l = [u_l(0), \ldots, u_l(N-1)]^T, |u_l(n)| = 1, n = 0, \ldots, N-1 \tag{2}$$

$$\theta_2 \in \left\{\frac{\pi}{2}, \frac{3\pi}{2}\right\}, \theta_3 \in \left\{\frac{2\pi}{3}, \frac{4\pi}{3}\right\}, \text{ and } \theta_4 = \pi \tag{3}$$

where W represents a precoding matrix, $\gamma$ represents a complex scalar value with the unit norm ($|\gamma|=1$), j represents a value of $\sqrt{-1}$, I represents a 3×3 identity matrix, u represents a Householder vector (e.g., from a Householder vector calculation (HVC)), l represents a precoding matrix index, and H represents a Hermitian transpose. In this case, the $\theta_3$ term of equation (3) may represent a case for a 3 Tx FC codebook. A procedure for constructing a 3 Tx fully coherent codebook may include selecting a set of rank 1 vectors $w_l$ (e.g., for l=0, . . . , L−1) (e.g., using a structured design with a fixed alphabet size to maximize a minimum chordal distance between precoders); selecting Householder vectors (e.g., HVC vectors) that satisfy a first column of $W_l=w_l$; selecting a rank 3 codebook with Householder matrices with the Householder vectors; and selecting a rank 2 codebook using column selection. For example, when $u_l=[1, \alpha_1, \alpha_2]^T, |\alpha_i|^2=1$, a scaled version of a Householder matrix may take the form:

$$w_l = e^{-j\frac{\pi}{6}}\left(I - \frac{\left(1 - e^{j\frac{2\pi}{3}}\right)}{u_l^H u_l} u_l u_l^H\right) = \frac{1}{\sqrt{3}}\begin{bmatrix} 1 & e^{j\frac{2\pi}{3}}\alpha_1^* & e^{j\frac{2\pi}{3}}\alpha_2^* \\ e^{j\frac{2\pi}{3}}\alpha_1 & 1 & e^{j\frac{2\pi}{3}}\alpha_1\alpha_2^* \\ e^{j\frac{2\pi}{3}}\alpha_2 & e^{j\frac{2\pi}{3}}\alpha_2\alpha_1^* & 1 \end{bmatrix}$$

and, a first column of $W_l$ is $$w_l^{(1)} = \frac{1}{\sqrt{3}}[1, w_1, w_2]^T, \text{ where } \alpha_1 = w_1 e^{-j\frac{2\pi}{3}}, \alpha_2 = w_2 e^{-j\frac{2\pi}{3}},$$

such that:

$$W_l = \frac{1}{\sqrt{3}}\begin{bmatrix} 1 & e^{-j\frac{2\pi}{3}}w_1^* & e^{-j\frac{2\pi}{3}}w_2^* \\ w_1 & 1 & e^{j\frac{2\pi}{3}}w_1 w_2^* \\ w_2 & e^{j\frac{2\pi}{3}}w_2 w_1^* & 1 \end{bmatrix}.$$

To obtain the rank 1 codebook using a structured design with a small alphabet size may take the form:

$$w_{l_0, l_1, \ldots, l_{K-1}} = \frac{1}{\sqrt{N}}\begin{bmatrix} e^{j2\pi\left(\frac{a_{0,0}}{q_0}l_0 + \ldots + \frac{a_{0,K-1}}{q_{K-1}}l_{K-1}\right)} \\ e^{j2\pi\left(\frac{a_{1,0}}{q_0}l_0 + \ldots + \frac{a_{1,K-1}}{q_{K-1}}l_{K-1}\right)} \\ \vdots \\ e^{j2\pi\left(\frac{a_{N-1,0}}{q_0}l_0 + \ldots + \frac{a_{N-1,K-1}}{q_{K-1}}l_{K-1}\right)} \end{bmatrix},$$

$$l_i = 0, 1, \ldots, q_i - 1$$

where an alphabet size of each element is $LCM(q_0, \ldots, q_{K-1})$ and a codebook size $L=q_0 q_1 \ldots q_{K-1}$. Parameter optimization may be performed to maximize the minimum chordal distance, defined as $$d_{chordal}\left(w_{l_0,l_1,\ldots,l_{K-1}}, w_{l_0',l_1',\ldots,l_{K-1}'}\right) = \sqrt{1 - \left|w_{l_0,l_1,\ldots,l_{K-1}}^H w_{l_0',l_1',\ldots,l_{K-1}'}\right|^2},$$

which may correspond to minimizing a maximum correlation (termed a "Minmax correlation") according to:

$$\begin{pmatrix} a_{0,0}, a_{0,1}, \ldots, a_{0,K-1} \\ \vdots \\ a_{N-1,0}, a_{N-1,1}, \ldots, a_{N-1,K-1} \end{pmatrix}^* =$$

$$\min_{\substack{0 \le a_{0,0},\ldots,a_{N-1,0} \le q_0-1 \\ \vdots \\ 0 \le a_{0,K-1},\ldots,a_{N-1,K-1} \le q_{N-1}-1}} \max_{(l_0,\ldots,l_{K-1})=(0,\ldots,1),\ldots,(q_0,\ldots,q_{K-1})} \frac{1}{N}\left|\sum_{n=0}^{N-1} e^{j2\pi\left(\frac{a_{n,0}}{q_0}l_0 + \ldots + \frac{a_{n,K-1}}{q_{K-1}}l_{K-1}\right)}\right|.$$

The parameter optimization may result in a set of elements for different length values. For example, elements in $$\left\{1, e^{j\frac{2\pi}{3}}, e^{j\frac{4\pi}{3}}\right\}$$

may include L=9: (K=2, q0=3, q1=3) with $$A^* = \begin{pmatrix} 0 & 0 & 1 \\ 0 & 1 & 0 \end{pmatrix},$$

resulting in a Minmax correlation=0.5774. Similarly, elements in $$\left\{1, e^{j\frac{2\pi}{3}}, e^{j\frac{4\pi}{3}}\right\} \times \left\{1, e^{j\pi}\right\}$$

may include L=4: (K=2, q0=2, q1=2) with $$A^* = \begin{pmatrix} 0 & 0 & 1 \\ 0 & 1 & 0 \end{pmatrix},$$

resulting in a Minmax correlation=0.3333 and L=6: (K=2, q0=3, q1=2) with $$A^* = \begin{pmatrix} 0 & 0 & 1 \\ 0 & 1 & 0 \end{pmatrix}$$

resulting in a Minmax correlation=0.5774. Similarly, elements in $$\left\{1, e^{j\frac{2\pi}{3}}, e^{j\frac{4\pi}{3}}\right\} \times \left\{1, e^{j\frac{\pi}{2}}, e^{j\pi}, e^{j\frac{3\pi}{2}}\right\}$$

may include L=8: (K=2, q0=4, q1=2) with $$A^* = \begin{pmatrix} 0 & 0 & 1 \\ 0 & 1 & 0 \end{pmatrix},$$

resulting in a Minmax correlation=0.7454; L=12: (K=2, q0=4, q1=3) with $$A^* = \begin{pmatrix} 0 & 0 & 1 \\ 0 & 1 & 0 \end{pmatrix},$$

resulting in a Minmax correlation=0.7454; and L=16: (K=2, q0=4, q1=4) with $$A^* = \begin{pmatrix} 0 & 0 & 1 \\ 0 & 1 & 0 \end{pmatrix},$$

resulting in a Minmax correlation=0.7454.

Referring to FIG. 11, a table identifies different quantity of precoders, the exponents of a rank 1 codebook, and a Minmax correlation for each quantity of precoders. Similarly, FIG. 12 shows a table of exponents of u vectors for a rank 1 codebook associated with a set of Householder vectors. FIG. 13 shows a table of $u_l$ and $\sqrt{3}W_l$ vectors for different values of l for a rank 3 codebook for L=9. FIGS. 14 and 15 show tables of examples of $u_l$ and $\sqrt{3}W_l$ vectors for different values of l for a rank 3 codebook for L=8.

In some aspects, UE 120 may use a 3 Tx codebook associated with cyclic prefix (CP) orthogonal frequency division multiplexing (OFDM) (CP-OFDM) precoding. In this case, UE 120 may select a precoder based on the RI and TPMI as shown, for example, in FIGS. 16A-16C for ranks 1 through 3, respectively.

In some aspects, one or more codebooks may be grouped into a codebook subset restriction (CSR) group. For example, UE 120 may be configured with a single NC codebook, a single PC codebook, and a single FC codebook. In this case, UE 120 may be configured with a first CSR for the NC codebook, a second CSR for the PC codebook, and a third CSR for the FC codebook. As shown in FIG. 17A, when UE 120 receives an indication of the first CSR for the NC codebook, UE 120 may interpret a 4 bit TPMI field (e.g., corresponding to values 0 to 9) in the uplink grant using the illustrated mapping. When the UE 120 receives an indication of the second CSR for the PC codebook, UE 120 may interpret a 3 bit TPMI field (e.g., corresponding to values 0 to 6) in the uplink grant using the illustrated mapping. In contrast, when UE 120 receives an indication of the third CSR for the FC codebook, UE 120 may interpret a 2 bit RI field (e.g., corresponding to values 0 to 3) and a 3 bit TPMI field (e.g., corresponding to values 0 to 7) in the uplink grant using the illustrated mapping. In these cases, the TPMI index may correspond to a precoder, as shown in FIGS. 16A-16C.

Alternatively, UE 120 may be configured with a first CSR for an NC codebook, a second CSR for an NC codebook and a PC codebook, and a third CSR for an NC codebook, a PC codebook, and an FC codebook. As shown in FIG. 17B, UE 120 may map a TPMI bit field (e.g., a 3, 4 or 6 bit TPMI field) included in the uplink grant using the illustrated mapping. As shown, for the second CSR, a single precoder between TPMI=1 and TPMI=2 for 3 MIMO layers may be selected to maintain a 4-bit TPMI field. In another example, as shown in FIG. 17C, UE 120 may map a TPMI bit field (e.g., a 3, 4 or 6 bit TPMI field) included in the uplink grant using the illustrated mapping and using a single precoding matrix for TPMI=0 and 3 MIMO layers. Similarly, FIGS. 17D-17G show examples of other mappings of TPMI fields (e.g., 3, 4, or 5 bit TPMI fields), such as with TPMI fields 24-31 indicating 8 precoders, which are down-selected from a set of precoders:{2 layers: TPMI=7-15}∪{3 layers: TPMI=3-11}. FIGS. 17H-17I show an example of a 2-bit RI field indicating a number of layers for transmission and a mapping of the 2 bit RI field and a TPMI field (e.g., a 2, 3, or 4 bit TPMI field) for a type of CSR.

Figure 18:
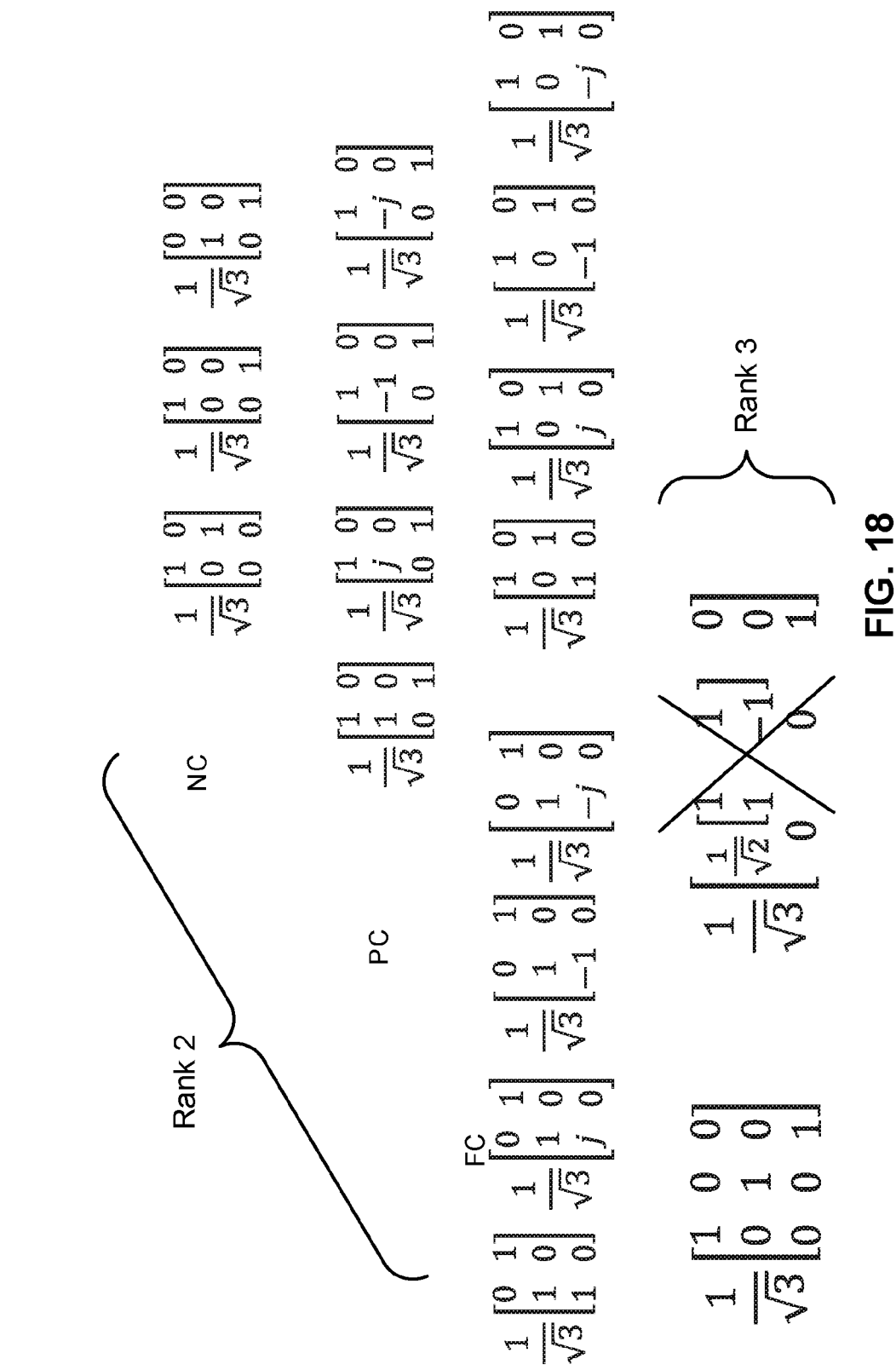

In some aspects, UE 120 may use a discrete-Fourier-transform (DFT) spread OFDM (DFT-s-OFDM) 3 Tx codebook. In a DFT-s-OFDM 3 Tx codebook, FC precoders may have a constraint on element alphabet size, such that 4, 6, 8, or 9 precoders are used in rank 1 for FC. Further, in rank 1, an NC 3 Tx codebook may have 3 precoders and a PC 3 Tx codebook may have 4 precoders. FIG. 18 illustrates an example of precoders for rank 2 (e.g., for NC, PC, and FC) and for rank 3 (e.g., a single identity precoder). Similarly, for DFT-s-OFDM, FIGS. 19A-19B illustrate examples of mapping of TPMI indices to precoders for different rank codebooks. The above structured design with a small alphabet size may be used for the DFT-s-OFDM 3 Tx codebook. FIG. 20 shows an example of some possible configurations for a rank 1 FC codebook for DFT-s-OFDM. FIGS. 21A-21B show examples of a structured design for L=9 with subsamplings (e.g., of L=8, 6, or 4). FIGS. 21C-21D show examples of a structured design for L=4 and L=16 (e.g., with sub-sampling to L=8 and L=6), respectively. FIGS. 22A-22B show examples of mappings of TPMI indices to precoders for ranks 1 through 3.

In some aspects, UE 120 may be configured with mappings of TPMI bit fields and/or RI fields to Tx codebooks for DFT-s-OFDM in connection with CSR groups. For example, FIGS. 23A-23E show examples of mappings between TPMI bit fields and codebook subsets associated with CSR groupings.

As indicated above, FIG. 5 is provided as an example. Other examples may differ from what is described with respect to FIG. 5. Further, as indicated above, FIGS. 8-23E are provided as examples. Other examples may differ from what is described with respect to FIGS. 8-23E.

Figure 6:
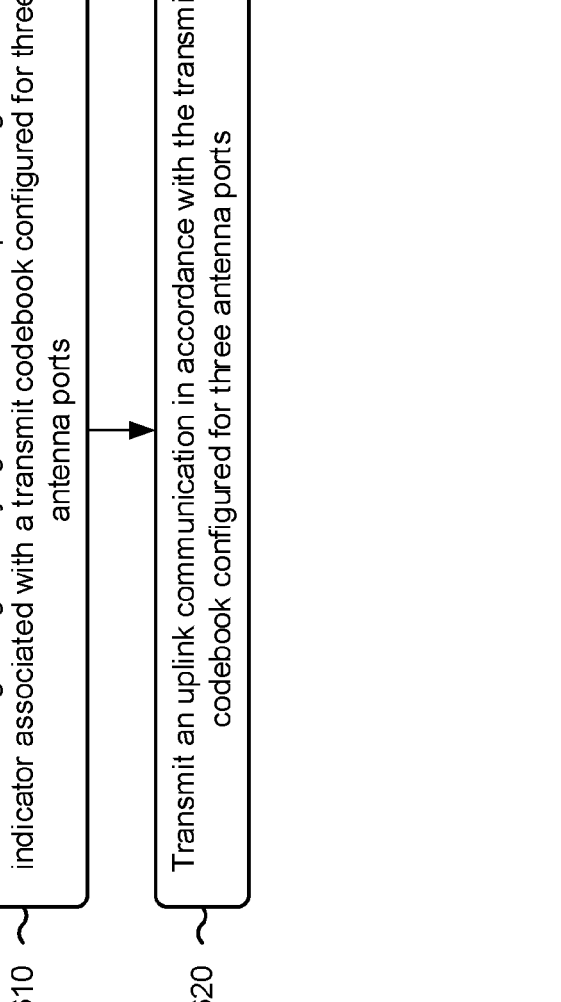
FIG. 6 is a diagram illustrating an example process associated with codebook and control signaling for uplink, in accordance with the present disclosure.

FIG. 6 is a diagram illustrating an example process 600 performed, for example, by a user equipment (UE), in accordance with the present disclosure. Example process 600 is an example where the UE (e.g., UE 120) performs operations associated with techniques for codebook and control signaling for uplink.

As shown in FIG. 6, in some aspects, process 600 may include receiving signaling identifying a transmission precoding matrix indicator associated with a transmit codebook configured for three antenna ports (block 610). For example, the UE (e.g., using communication manager 140 and/or reception component 702, depicted in FIG. 7) may receive signaling identifying a transmission precoding matrix indicator associated with a transmit codebook configured for three antenna ports, as described above.

As further shown in FIG. 6, in some aspects, process 600 may include transmitting an uplink communication in accordance with the transmit codebook configured for three antenna ports (block 620). For example, the UE (e.g., using communication manager 140 and/or transmission component 704, depicted in FIG. 7) may transmit an uplink communication in accordance with the transmit codebook configured for three antenna ports, as described above.

Process 600 may include additional aspects, such as any single aspect or any combination of aspects described below and/or in connection with one or more other processes described elsewhere herein.

In a first aspect, transmitting the uplink communication comprises transmitting the uplink communication using one or more radio frequency transmit chains.

In a second aspect, alone or in combination with the first aspect, the transmit codebook configured for three antenna ports is associated with cyclic-prefix orthogonal frequency division multiplexing of symbols of the uplink communication.

In a third aspect, alone or in combination with one or more of the first and second aspects, the transmission precoding matrix indicator is associated with a rank indication for the uplink communication.

In a fourth aspect, alone or in combination with one or more of the first through third aspects, the transmit codebook configured for three antenna ports is associated with discrete Fourier transform spread orthogonal frequency division multiplexing of symbols of the uplink communication.

In a fifth aspect, alone or in combination with one or more of the first through fourth aspects, the transmit codebook configured for three antenna ports is non-coherent, partially coherent, or fully coherent.

In a sixth aspect, alone or in combination with one or more of the first through fifth aspects, the UE is configured with a fixed port grouping and the transmit codebook configured for three antenna ports is configured for the fixed port grouping.

In a seventh aspect, alone or in combination with one or more of the first through sixth aspects, the UE is configured for coherence between two of the three antenna ports and is configured for non-coherence between the other antenna port of the three antenna ports and the two of the three antenna ports.

In an eighth aspect, alone or in combination with one or more of the first through seventh aspects, the transmit codebook configured for partial coherence of the three antenna ports.

In a ninth aspect, alone or in combination with one or more of the first through eighth aspects, the transmit codebook configured for three antenna ports is based at least in part on a Householder vector calculation (HVC).

In a tenth aspect, alone or in combination with one or more of the first through ninth aspects, the transmit codebook configured for three antenna ports is defined by an equation $$W_l = e^{-j\frac{\pi}{6}}\left(I - \frac{\left(1 - e^{j\frac{2\pi}{3}}\right)}{u_l^H u_l}u_l u_l^H\right)$$

where W represents a precoding matrix, j represents a value of −1, I represents a 3×3 identity matrix, u represents a Householder vector, l represents a precoding matrix index, and H represents a Hermitian transpose.

In an eleventh aspect, alone or in combination with one or more of the first through tenth aspects, the transmit codebook configured for three antenna ports is based at least in part on a structured design configuration.

In a twelfth aspect, alone or in combination with one or more of the first through eleventh aspects, the UE is configured with a set of codebook subset restriction (CSR) configurations from which the transmit codebook configured for three antenna ports is selected, the set of CSR configurations including a first CSR configuration for a non-coherent codebook, a second CSR configuration for a partially coherent codebook, or a third CSR configuration for a fully coherent codebook.

In a thirteenth aspect, alone or in combination with one or more of the first through twelfth aspects, the UE is configured with a set of codebook subset restriction (CSR) configurations from which the transmit codebook configured for three antenna ports is selected, the set of CSR configurations including a first CSR configuration for a non-coherent codebook, a second CSR configuration for the non-coherent codebook and a partially coherent codebook, or a third CSR configuration for the non-coherent codebook, the partially coherent codebook, and a fully coherent codebook.

In a fourteenth aspect, alone or in combination with one or more of the first through thirteenth aspects, the transmission precoding matrix indicator is associated with a multi-bit transmission precoding matrix indicator field associated with a mapping to a non-coherent codebook or a partially coherent codebook.

In a fifteenth aspect, alone or in combination with one or more of the first through fourteenth aspects, the transmit codebook configured for three antenna ports is configured with 1, 3, 4, 6, 8, or 9 precoders based at least in part on a rank or type of coherency.

In a sixteenth aspect, alone or in combination with one or more of the first through fifteenth aspects, the transmission precoding matrix indicator is associated with at least one of a 2-bit rank indicator field or a 3-bit transmission precoding matrix indicator field associated with a mapping to a fully coherent codebook.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
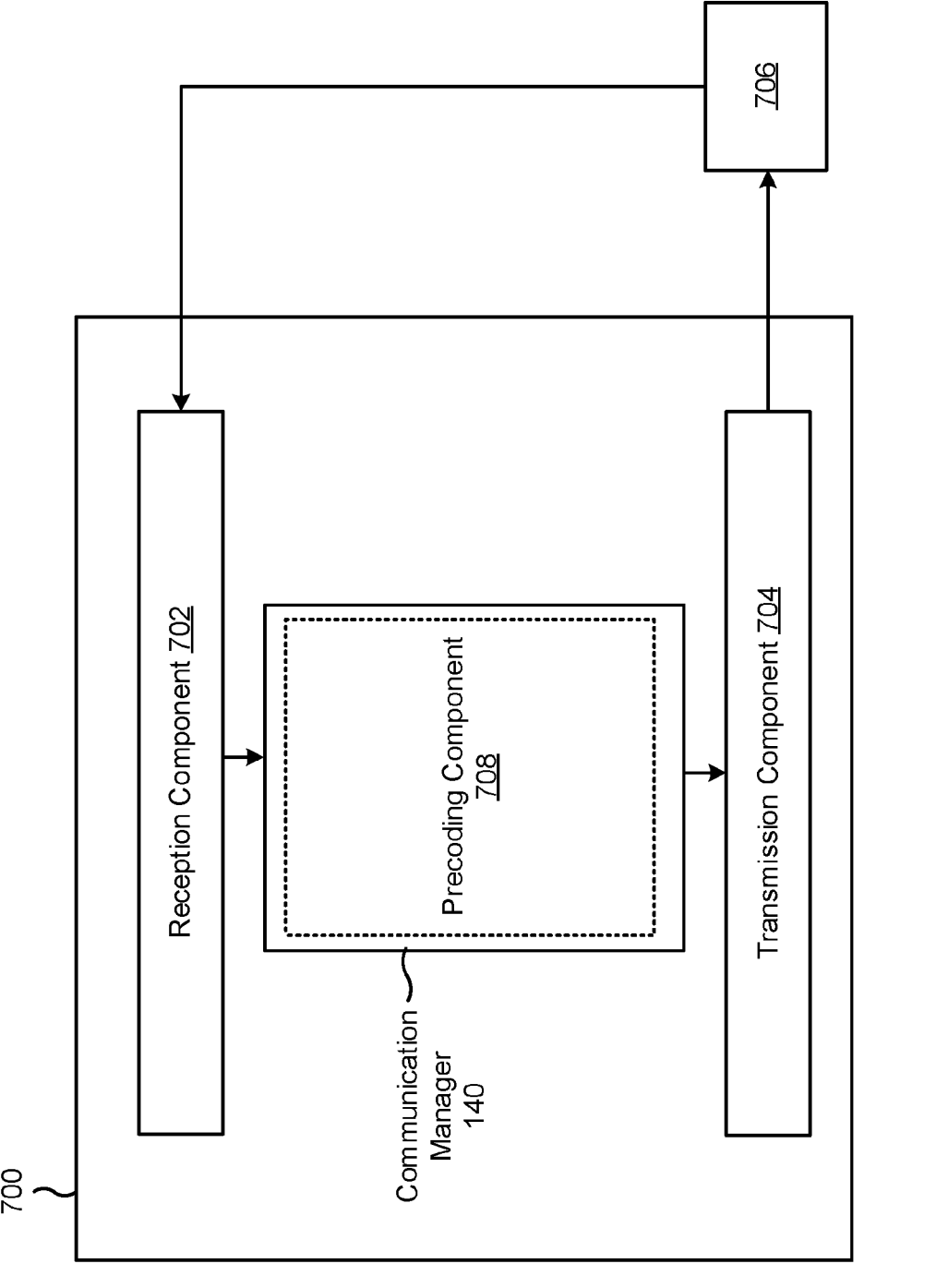
FIG. 7 is a diagram of an example apparatus for wireless communication, in accordance with the present disclosure.

FIG. 7 is a diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include a precoding component 708, among other examples.

In some aspects, the apparatus 700 may be configured to perform one or more operations described herein in connection with FIGS. 5 and 8-23E. Additionally, or alternatively, the apparatus 700 may be configured to perform one or more processes described herein, such as process 600 of FIG. 6. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The reception component 702 may receive signaling identifying a transmission precoding matrix indicator associated with a transmit codebook configured for three antenna ports. The transmission component 704 may transmit an uplink communication in accordance with the transmit codebook configured for three antenna ports. The precoding component 708 may precode symbols of the uplink communication in accordance with the transmit codebook configured for three antenna ports.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a user equipment (UE), comprising: receiving signaling identifying a transmission precoding matrix indicator associated with a transmit codebook configured for three antenna ports; and transmitting an uplink communication in accordance with the transmit codebook configured for three antenna ports.

Aspect 2: The method of Aspect 1, wherein transmitting the uplink communication comprises: transmitting the uplink communication using one or more radio frequency transmit chains.

Aspect 3: The method of any of Aspects 1 to 2, wherein the transmit codebook configured for three antenna ports is associated with cyclic-prefix orthogonal frequency division multiplexing of symbols of the uplink communication.

Aspect 4: The method of any of Aspects 1 to 3, wherein the transmission precoding matrix indicator is associated with a rank indication for the uplink communication.

Aspect 5: The method of any of Aspects 1 to 4, wherein the transmit codebook configured for three antenna ports is associated with discrete Fourier transform spread orthogonal frequency division multiplexing of symbols of the uplink communication.

Aspect 6: The method of any of Aspects 1 to 5, wherein the transmit codebook configured for three antenna ports is non-coherent, partially coherent, or fully coherent.

Aspect 7: The method of any of Aspects 1 to 6, wherein the UE is configured with a fixed port grouping and the transmit codebook configured for three antenna ports is configured for the fixed port grouping.

Aspect 8: The method of any of Aspects 1 to 7, wherein the UE is configured for coherence between two of the three antenna ports and is configured for non-coherence between the other antenna port of the three antenna ports and the two of the three antenna ports.

Aspect 9: The method of Aspect 8, wherein the transmit codebook configured for partial coherence of the three antenna ports.

Aspect 10: The method of any of Aspects 1 to 9, wherein the transmit codebook configured for three antenna ports is based at least in part on a Householder vector calculation (HVC).

Aspect 11: The method of any of Aspects 1 to 10, wherein the transmit codebook configured for three antenna ports is defined by an equation:

$$W_l = e^{-j\frac{\pi}{6}}\left(I - \frac{\left(1 - e^{j\frac{2\pi}{3}}\right)}{u_l^H u_l}u_l u_l^H\right)$$

where W represents a precoding matrix, j represents a value of $-1$, I represents a 3×3 identity matrix, u represents a Householder vector, l represents a precoding matrix index, and H represents a Hermitian transpose.

Aspect 12: The method of any of Aspects 1 to 11, wherein the transmit codebook configured for three antenna ports is based at least in part on a structured design configuration.

Aspect 13: The method of any of Aspects 1 to 12, wherein the UE is configured with a set of codebook subset restriction (CSR) configurations from which the transmit codebook configured for three antenna ports is selected, the set of CSR configurations including: a first CSR configuration for a non-coherent codebook, a second CSR configuration for a partially coherent codebook, or a third CSR configuration for a fully coherent codebook.

Aspect 14: The method of any of Aspects 1 to 12, wherein the UE is configured with a set of codebook subset restriction (CSR) configurations from which the transmit codebook configured for three antenna ports is selected, the set of CSR configurations including: a first CSR configuration for a non-coherent codebook, a second CSR configuration for the non-coherent codebook and a partially coherent codebook, or a third CSR configuration for the non-coherent codebook, the partially coherent codebook, and a fully coherent codebook.

Aspect 15: The method of any of Aspects 1 to 14, wherein the transmission precoding matrix indicator is associated with a multi-bit transmission precoding matrix indicator field associated with a mapping to a non-coherent codebook or a partially coherent codebook.

Aspect 16: The method of any of Aspects 1 to 15, wherein the transmit codebook configured for three antenna ports is configured with 1, 3, 4, 6, 8, or 9 precoders based at least in part on a rank or type of coherency.

Aspect 17: The method of any of Aspects 1 to 16, wherein the transmission precoding matrix indicator is associated with at least one of a 2-bit rank indicator field or a 3-bit transmission precoding matrix indicator field associated with a mapping to a fully coherent codebook.

Aspect 18: An apparatus for wireless communication at a device, comprising a processor; memory coupled with the processor; and instructions stored in the memory and executable by the processor to cause the apparatus to perform the method of one or more of Aspects 1-17.

Aspect 19: A device for wireless communication, comprising a memory and one or more processors coupled to the memory, the one or more processors configured to perform the method of one or more of Aspects 1-17.

Aspect 20: An apparatus for wireless communication, comprising at least one means for performing the method of one or more of Aspects 1-17.

Aspect 21: A non-transitory computer-readable medium storing code for wireless communication, the code comprising instructions executable by a processor to perform the method of one or more of Aspects 1-17.

Aspect 22: A non-transitory computer-readable medium storing a set of instructions for wireless communication, the set of instructions comprising one or more instructions that, when executed by one or more processors of a device, cause the device to perform the method of one or more of Aspects 1-17.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

a memory; and one or more processors, coupled to the memory, configured to:

receive signaling identifying a transmission precoding matrix indicator associated with a transmit codebook configured for three antenna ports, wherein the transmission precoding matrix indicator is associated with a multi-bit transmission precoding matrix indicator field included in an uplink grant, wherein the transmit codebook configured for the three antenna ports allows a plurality of different combinations of partial coherency of the three antenna ports; and transmit an uplink communication in accordance with the transmit codebook configured for the three antenna ports, wherein the transmit codebook configured for the three antenna ports is based at least in part on an equation that comprises two Hermitian transposes of a Householder vector, wherein the equation is associated with a scaled version of a Householder matrix.

2. The UE of claim 1, wherein the one or more processors, to transmit the uplink communication, are configured to:

transmit the uplink communication using three or more radio frequency transmit chains, wherein a first radio frequency transmit chain and a second radio frequency transmit chain are coherent with each other, and wherein a third radio frequency transmit chain is non-coherent with the first radio frequency transmit chain and the second radio frequency transmit chain.

3. The UE of claim 1, wherein the transmit codebook configured for the three antenna ports is associated with cyclic-prefix orthogonal frequency division multiplexing of symbols of the uplink communication.

4. The UE of claim 1, wherein the transmission precoding matrix indicator is associated with a rank indication for the uplink communication.

5. The UE of claim 1, wherein the transmit codebook configured for the three antenna ports is associated with discrete Fourier transform spread orthogonal frequency division multiplexing of symbols of the uplink communication.

6. The UE of claim 1, wherein the transmit codebook configured for the three antenna ports is partially coherent.

7. The UE of claim 1, wherein the UE is configured with a port grouping and the transmit codebook configured for the three antenna ports is configured for the port grouping.

8. The UE of claim 1, wherein the UE is configured for coherence between two of the three antenna ports and is configured for non-coherence between the other antenna port of the three antenna ports.

9. The UE of claim 1, wherein wherein the uplink communication is transmitting using a plurality of radio frequency transmit chains, and wherein a first radio frequency transmit chain and a second radio frequency transmit chain are coherent with each other.

10. The UE of claim 1, wherein the equation comprises:

$$W_l = e^{-j\frac{\pi}{6}}\left(I - \frac{\left(1 - e^{j\frac{2\pi}{3}}\right)}{u_l^H u_l}u_l u_l^H\right)$$

where W represents a precoding matrix, j represents a value of −1, I represents a 3×3 identity matrix, u represents the Householder vector, l represents a precoding matrix index, and H represents a Hermitian transpose.

11. The UE of claim 1, wherein the transmit codebook configured for the three antenna ports is based at least in part on a structured design configuration.

12. The UE of claim 1, wherein the UE is configured with a set of codebook subset restriction (CSR) configurations from which the transmit codebook configured for the three antenna ports is selected, the set of CSR configurations including:

a first CSR configuration for a non-coherent codebook,
a second CSR configuration for a partially coherent codebook, or
a third CSR configuration for a fully coherent codebook.

13. The UE of claim 1, wherein the UE is configured with a set of codebook subset restriction (CSR) configurations from which the transmit codebook configured for the three antenna ports is selected, the set of CSR configurations including:

a first CSR configuration for a non-coherent codebook,
a second CSR configuration for the non-coherent codebook and a partially coherent codebook, or
a third CSR configuration for the non-coherent codebook, the partially coherent codebook, and a fully coherent codebook.

14. The UE of claim 1, wherein the multi-bit transmission precoding matrix indicator field is associated with a mapping to a non-coherent codebook or a partially coherent codebook.

15. The UE of claim 1, wherein the transmit codebook configured for the three antenna ports is configured with 1, 3, 4, 6, 8, or 9 precoders based at least in part on a rank or type of coherency.

16. The UE of claim 1, wherein the transmission precoding matrix indicator is associated with a 2-bit rank indicator field and a 3-bit transmission precoding matrix indicator field associated with a mapping to a fully coherent codebook.

17. The UE of claim 1, wherein:

a first combination of the plurality of different combinations comprises a first antenna port of the three antenna ports and a second antenna port of the three antenna ports being coherent, and a third antenna port of the three antenna ports being non-coherent with the first antenna port and the second antenna port; and a second combination of the plurality of different combinations comprises the second antenna port and the third antenna port being coherent, and the first antenna port being non-coherent with the second antenna port and the third antenna port.

18. The UE of claim 1, wherein the Householder vector is based at least in part on a transpose operation.

19. A method of wireless communication performed by a user equipment (UE), comprising:

receiving signaling identifying a transmission precoding matrix indicator associated with a transmit codebook configured for three antenna ports, wherein the transmission precoding matrix indicator is associated with a multi-bit transmission precoding matrix indicator field included in an uplink grant, wherein the transmit codebook configured for the three antenna ports allows a plurality of different combinations of partial coherency of the three antenna ports; and transmitting an uplink communication in accordance with the transmit codebook configured for the three antenna ports, wherein the transmit codebook configured for the three antenna ports is based at least in part on an equation that comprises two Hermitian transposes of a Householder vector, wherein the equation is associated with a scaled version of a Householder matrix.

20. A non-transitory computer-readable medium storing a set of instructions for wireless communication, the set of instructions comprising:

one or more instructions that, when executed by one or more processors of a user equipment (UE), cause the UE to:

receive signaling identifying a transmission precoding matrix indicator associated with a transmit codebook configured for three antenna ports, wherein the transmission precoding matrix indicator is associated with a multi-bit transmission precoding matrix indicator field included in an uplink grant, wherein the transmit codebook configured for the three antenna ports allows a plurality of different combinations of partial coherency of the three antenna ports; and transmit an uplink communication in accordance with the transmit codebook configured for the three antenna ports, wherein the transmit codebook configured for the three antenna ports is based at least in part on an equation that comprises two Hermitian transposes of a Householder vector, wherein the equation is associated with a scaled version of a Householder matrix.

* * * * *